(12) United States Patent
Adib et al.

(10) Patent No.: US 12,555,332 B2
(45) Date of Patent: Feb. 17, 2026

(54) AUGMENTED REALITY WITH NON-LINE-OF-SIGHT PERCEPTION

(71) Applicant: Massachusetts Institute of Technology, Cambridge, MA (US)

(72) Inventors: Fadel Adib, Cambridge, MA (US); Tara Boroushaki, Cambridge, MA (US); Laura Noelle Dodds, Cambridge, MA (US); Aline Eid, Ann Arbor, MI (US); Maisy Lilian Lam, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 334 days.

(21) Appl. No.: 18/355,600

(22) Filed: Jul. 20, 2023

(65) Prior Publication Data

US 2024/0096034 A1 Mar. 21, 2024

Related U.S. Application Data

(60) Provisional application No. 63/408,240, filed on Sep. 20, 2022.

(51) Int. Cl.
*G06T 19/00* (2011.01)
*G01S 5/02* (2010.01)
(Continued)

(52) U.S. Cl.
CPC .............. *G06T 19/006* (2013.01); *G01S 5/02* (2013.01); *G01S 13/06* (2013.01); *G02B 27/017* (2013.01); *G01S 13/90* (2013.01)

(58) Field of Classification Search
None
See application file for complete search history.

(56) References Cited

U.S. PATENT DOCUMENTS 9,948,413 B1\* 4/2018 Zhou ................ H04B 17/14
2009/0215536 A1\* 8/2009 Yee .................. A63F 13/211
463/30
(Continued)

FOREIGN PATENT DOCUMENTS

CN 112085134 A \* 12/2020 ......... G06K 17/0029
WO WO-2023183659 A1 \* 9/2023 ......... G06K 7/10366

OTHER PUBLICATIONS

Author: Liang et al.; Title: E3DinSAR: 3-D Localization of RFID-Tagged Objects Based on Interference Synthetic Apertures; Source: IEEE Internet of Things Journal, vol. 7; Date: Dec. 12, 2020 (Year: 2020).\*
(Continued)

*Primary Examiner* — Jwalant Amin
(74) *Attorney, Agent, or Firm* — Daly, Crowley, Mofford & Durkee, LLP

(57) ABSTRACT

According to one aspect of the disclosure, a mobile augmented reality (AR) system can include: a receiver configured to receive radio frequency (RF) signals from one or more items located within an environment; a tracking module configured to generate tracking data responsive to a location of the system within the environment over time; a display device; and one or more processors configured to determine a location of at least one of the one or more items within the environment using the received RF signals and the tracking data, and generate a visual representation of the location of the at least one item for display on the display device.

19 Claims, 9 Drawing Sheets

(51) Int. Cl.
*G01S 13/06* (2006.01)
*G02B 27/01* (2006.01)
*G01S 13/90* (2006.01)

(56) References Cited

U.S. PATENT DOCUMENTS

| | | | | |
|---|---|---|---|---|
| 2016/0005233 | A1* | 1/2016 | Fraccaroli | G06F 3/0487 345/633 |
| 2019/0113609 | A1* | 4/2019 | Baheti | H01Q 9/0457 |
| 2020/0119780 | A1* | 4/2020 | Klemmer | H01Q 3/24 |
| 2024/0037907 | A1* | 2/2024 | Koch | G06K 7/10722 |

OTHER PUBLICATIONS

Boroushaki et al., "FuseBot: RF-Visual Mechanical Search"; Massachusetts Institute of Technology, Robotics: Science and Systems Jun. 2022-Jul. 2022; 12 pages.
Chatzistefanou et al., "Tag Localization by Handheld UHF RFID Reader with Optical and RFID Landmarks"; IEEE Journal of Radio Frequency Identification, Nov. 2022; 12 pages.
Doong, "A closed-form formula for GPS GDOP computation"; GPS Solut (2009), Nov. 2008; pp. 183-190 (8 pages).
Rashid et al., "Bringing Online Shopping Experience to Offline Retail through Augmented Reality and RFID"; ResearchGate, Conference Paper, Oct. 2015; 8 pages.
Kunkel et al., "A Concept for Infrastructure Independent Localization and Augmented Reality Visualization of RFID Tags", IEEE MTT-S International Microwave Workshop on Wireless Sensing, Local Positioning and RFID (IMWS 2009—Croatia), 2009; 4 pages.
Yamashita et al., "Pedestrian Navigation System for Visually Impaired People Using HoloLens and RFID"; 2017 Conference on Technologies and Applications of Artificial Intelligence (TAAI), Dec. 2017; 6 pages.
Sain, "A new era for RFID in retail"; Accenture, 2021; 14 pages.
Adib et al., "See Through Walls with Wi-Fi!"; Massachusetts Institute of Technology, Proceedings of the ACM SIGCOMM 2013 Conference on SIGCOMM, Aug. 2013; 12 pages.
Azuma, "A Survey of Augmented Reality"; Presence, vol. 6, No. 4, Aug. 1997; pp. 355-385 (31 pages).
Azzouzi et al., "New Measurement Results for the Localization of UHF RFID Transponders Using an Angle of Arrival (AoA) Approach"; 2011 IEEE Conference on RFID, Apr. 2011; pp. 91-97 (7 pages).
Xie et al., "TaggedAR: An RFID-Based Approach for Recognition of Multiple Tagged Objects in Augmented Reality Systems"; IEEE Transactions on Mobile Computing, vol. 18, No. 5, May 2019; pp. 1188-1202 (15 pages).
Xie et al., "Tell Me What I See: Recognize RFID Tagged Objects in Augmented Reality Systems"; UBICOMP '16, Sep. 2016; pp. 916-927 (12 pages).
Boroushaki et al., "FuseBot: Mechanical Search of Rigid and Deformable Objects via Multi-Modal Perception"; Massachusetts Institute of Technology, Research Square, Feb. 2023; 29 pages.
Boroushaki et al., "Robotic Grasping of Fully-Occluded Objects RF Perception"; Massachusetts Institute of Technology, 2021 IEEE International Conference on Robotics and Automation, May 30-Jun. 5, 2021; 7 pages.
Boroushaki et al., "RFusion: Robotic Grasping via RF-Visual Sensing and Learning"; Massachusetts Institute of Technology, Proceedings of the 19th ACM Conference on Embedded Networked Sensor Systems, Nov. 2021; 14 pages.
Cai et al., "Study of Human Head Effects on UWB Antenna"; IEEE International Workshop on Antenna Technology (IWAT 2005), Mar. 2005; pp. 310-313 (4 pages).
Chawla et al., "Real-Time RFID Localization Using RSS"; 2014 International Conference on Localization and GNSS, Jun. 2013; 6 pages.

Cheng et al., "In-Air Gesture Interaction: Real Time Hand Posture Recognition Using Passive RFID Tags"; Special Section on Artificial Intelligence in Cyberseurity, Jul. 2019; 13 pages.
Cihangir et al., "Dual-Band 4G Eyewear Antenna and SAR Implications"; IEEE Transactions on Antennas and Propagation, vol. 65, No. 4, Apr. 2017; 5 pages.
Cihangir et al., "Feasibility Study of 4G Cellular Antennas for Eyewear Communicating Devices"; IEEE Antennas and Wireless Propagation Letters, vol. 12, 2013; 4 pages.
Crespo-Bardera et al., "Design and Analysis of Conformal Antenna for Future Public Safety Communications"; IEEE Antennas & Propagation Magazine, Jul. 2020; pp. 94-102 (9 pages).
Gareis et al., "A MIMO UHF-RFID SAR 3D Locating System for Autonomous Inventory Robots"; 2020 IEEE MTT-S International Conference on Microwaves for Intelligent Mobility (ICMIM), Nov. 2020; 4 pages.
Haydar et al., "Design and Analysis of Conformal Antennas for Smart Glasses"; 12th European Conference on Antennas and Propagation (EuCAP 2018), Apr. 2018; 5 pages.
Jidhage et al., "Hooked Loop Antenna Concept for Bluetooth Headset Applications"; IEEE Antennas and Propagation Society Symposium, Jun. 2004; pp. 3521-3524 (4 pages).
Kronberger et al., "UHF RFID Localization System Based on a Phased Array Antenna"; 2011 IEEE International Symposium on Antennas and Propagation (APSURSI), Jul. 2011; 4 pages.
Liu et al., "Technical Evaluation of HoloLens for Multimedia: A First Look"; IEEE MultiMedia, vol. 25, Issue 4, Oct.-Dec. 2018; pp. 8-18 (11 pages).
Luo et al., "3D Backscatter Localization for Fine-Grained Robotics"; Proceedings of the $16^{th}$ USENIX Symposium on Networked Systems Design and Implementation, Feb. 2019; pp. 8-18 (18 pages).
Ma et al., "Minding the Billions: Ultra-wideband Localization for Deployed RFID Tags"; Proceedings of the $23^{rd}$ Annual International Conference on Mobile Computing and Networking, Oct. 2017; pp. 248-260 (13 pages).
Mahmood et al., "Recent Advances in Wearable Antenna Technologies: A Review"; Progress in Electromagnetics Research B, vol. 89, 1-27, 2020; 27 pages.
Miesen et al., "UHF RFID Localization Based on Synthetic Apertures"; IEEE Transactions on Automation Science and Engineering, vol. 10, No. 3, Jul. 2013; pp. 807-815 (9 pages).
Motroni et al., "A Multi-Antenna SAR-based method for UHF RFID Tag Localization via UGV"; 2018 IEEE International Conference on RFID Technology & Application (RFID-TA), Sep. 2018; 6 pages.
Ni et al., "LANDMARC: Indoor Location Sensing Using Active RFID"; Wireless Networks 10, 2004; pp. 701-710 (10 pages).
Plicanic et al., "Actual Diversity Performance of a Multiband Diversity Antenna With Hand and Head Effects"; IEEE Transactions on Antennas and Propagation, vol. 57, No. 5, May 2009; pp. 1547-1556 (10 pages).
Shangguan et al., "The Design and Implementation of a Mobile RFID Tag Sorting Robot"; Proceedings of the 14th Annual International Conference on Mobile Systems, Applications, and Services, 2016; pp. 31-42 (12 pages).
Wang et al., "RF-Compass: Robot Object Manipulation Using RFIDs"; Proceedings of the 19th Annual International Conference on Mobile Computing & Networking, 2013; pp. 3-14 (12 pages).
Wang et al., "Dude, Where's My Card? RFID Positioning That Works with Multipath and Non-Line of Sight"; Proceedings of the ACM SIGCOMM 2013 Conference on SIGCOMM, Aug. 2013; pp. 51-62 (12 pages).
Wang et al., "RF-IDraw: Virtual Touch Screen in the Air Using RF Signals"; ACM SIGCOMM Computer Communication Review, vol. 44, Issue 4, Oct. 2014; pp. 235-246 (12 pages).
Wang et al., "Sub-6GHZ 4G/5G Conformal Glasses Antennas"; IEEE Access, vol. 7, Dec. 2019; pp. 182027-182036 (10 pages).
Wei et al., "Design of a Wideband Horizontally Polarized Omnidirectional Printed Loop Antenna"; IEEE Antennas and Wireless Propagation Letters, vol. 11, 2012; pp. 49-52 (4 pages).
Yang et al., "Tagoram: Real-Time Tracking of Mobile RFID Tags to High Precision Using COTS Devices"; Proceedings of the 20th

(56) References Cited

OTHER PUBLICATIONS

Annual International Conference on Mobile Computing and Networking, Sep. 2014; pp. 237-248 (12 pages).

Yazdandoost et al., "Ultra Wideband L-Loop Antenna"; 2005 IEEE International Conference on Ultra-Wideband, Sep. 2005; pp. 201-205 (5 pages).

Yeo et al., "Miniaturized Wideband Loop Antenna Using a Multiple Half-Circular-Ring-Based Loop Structure and Horizontal Slits for Terrestrial DTV and UDH TV Applications"; Sensors 2021, 21, 2916, Apr. 2021; 14 pages.

Zhang et al., "RFID-assisted assembly guidance system in an augmented reality environment"; International Journal of Production Research, Vo. 49, No. 13, Jul. 2011; pp. 3919-3938 (21 pages).

Zhao et al., "PEC: Synthetic Aperture RFID Localization with Aperture Position Error Compensation"; 16th Annual IEEE International Conference on Sensing, Communication, and Networking (SECON), Sep. 2019; 9 pages.

Zhou et al., "Two-dimension Localization of Passive RFID Tags Using AOA Estimation"; 2011 IEEE International Instrumentation and Measurement Technology Conference, May 2011; 5 pages.

"ALN-9640 Squiggle Inlay", Alien Technology Corporation, Feb. 2014; 4 pages.

"About HoloLens 2", article dated Mar. 12, 2023; Microsoft; [retrieved on Jul. 13, 2023]. Retrieved from the Internet <URL: https://learn.microsoft.com/en-us/hololens/hololens2-hardware>; 10 pages.

"Hand tracking—MRTK2", article dated Aug. 1, 2022; Microsoft; [retrieved on Jul. 14, 2023]. Retrieved from the Internet <URL: https://learn.microsoft.com/en-us/windows/mixed-reality/mrtk-unity/mrtk2/features/input/hand-tracking?view=mrtkunity-2022-05>; 9 pages.

"Camera setup in Unity", article dated Mar. 2, 2023; Microsoft; [retrieved on Jul. 14, 2023]. Retrieved from the Internet <URL: https://learn.microsoft.com/en-us/windows/mixed-reality/develop/unity/camera-in-unity?tabs=mrtk>; 8 pages.

Microsoft webpage, "Microsoft Visual Studio"; Microsoft; [retrieved on Jul. 14, 2023]. Retrieved from the Internet <URL: https://visualstudio.microsoft.com/>; 11 pages.

Nuand webpage, "bladeRF 2.0 micro"; Nuand Microchip Specifications, Nuand LLC; [retrieved on Jul. 14, 2023]. Retrieved from the Internet <URL: https://www.nuand.com/bladerf-2-0-micro/>; 10 pages.

TeamViewer webpage, "TeamViewer Frontline"; TeamViewer Frontline Specifications, TeamViewer Germany GmbH; [retrieved on Jul. 14, 2023]. Retrieved from the Internet <URL: https://www.teamviewer.com/en-us/products/frontline/solutions/xpick/>; 6 pages.

Microsoft webpage, "HoloLens 2", HoloLens2 Specifications, Microsoft; [retrieved on Jul. 13, 2023]. Retrieved from the Internet <URL: https://www.microsoft.com/en-us/hololens/hardware#document-experiences>; 8 pages.

Culliford et al., "Facebook invests billions in metaverse efforts as ad business slows", Reuters, Oct. 2021; 4 pages.

T. Dengel, "Disruption Denied: How Next-Generation Logistics Create A Resilient Supply Chain", Forbes, SAP Brandvoice, Jun. 2022; 5 pages.

Fillmore et al., "AR and VR in the Workplace", IBM, IBM Institute for Business Value, Sep. 2020; 12 pages.

S. Galer, "Virtual Reality Emerges As Powerful Employee Training Tool", Forbes, SAP Brandvoice, May 2022; 5 pages.

L. Gates, "Augmented Reality (AR) to Improve Employee Performance", Insight, Aug. 2018; 6 pages.

"EPC Radio-Frequency Identity Protocols Generation-2 UHF RFID", EPCglobal Gen2 Specification, Version 2.0.1, Apr. 2015; 152 pages.

Hao et al., "Antennas and Propagation for Body Centric Wireless Communication", IEEE/ACES International Conference on Wireless Communications and Applied Computational Electromagnetics, 2005; 4 pages.

Kumar et al., "Accurate indoor localization with zero start-up cost", Proceedings of the 20th Annual International Conference on Mobile Computing and Networking, Sep. 2014; pp. 483-494 (12 pages).

Lin et al., "Beyond one-dollar mouse: A battery-free device for 3D human-computer interaction via RFID tags", 2015 IEEE Conference on Computer Communications (INFOCOM), Apr.-May 2015; pp. 1661-1669 (9 pages).

A. Sag, "Why Microsoft Won The $22 Billion Army Hololens 2 AR Deal", Forbes, Apr. 2021; 6 pages.

D. Kaye, "Apple teases metaverse AR plans, stock jumps", Reuters, Jan. 2022; 2 pages.

Smith et al., "Efficient 3-D Near-Field MIMO-SAR Imaging for Irregular Scanning Geometries", IEEE Access, vol. 10, Jan. 2022; pp. 10283-10294 (12 pages).

R. Tedrake, "Robotic Manipulation—Perception, Planning, and Control", Course Notes for MIT 6.4210, 2022; 162 pages.

Alvarez et al., "System Based on Compact mmWave Radar and Natural Body Movement for Assisting Visually Impaired People", IEEE Access, vol. 9, Sep. 2021; pp. 125042-125051 (10 pages).

Alvarez-Narciandi et al., "Towards Turning Smartphones Into mmWave Scanners", IEEE Access, vol. 9, Mar. 2021; pp. 45147-45154 (8 pages).

Alvarez-Narciandi et al., "Freehand, Agile, and High-Resolution Imaging With Compact mm-Wave Radar", IEEE Access, vol. 7, Jul. 2019; pp. 95516-95526 (11 pages).

\* cited by examiner

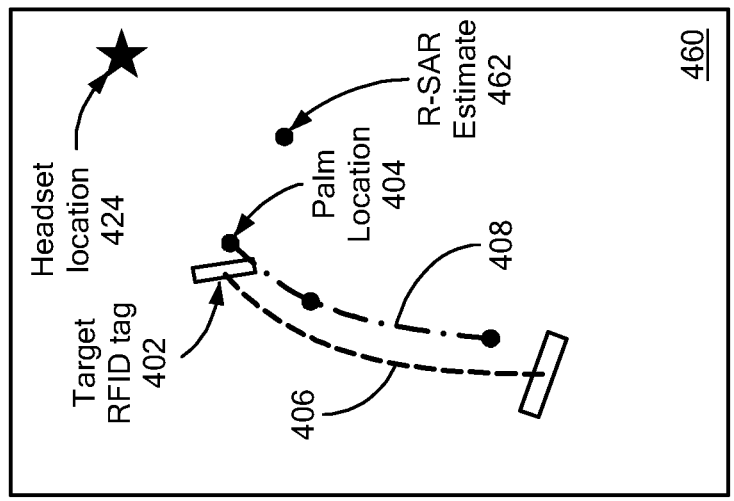
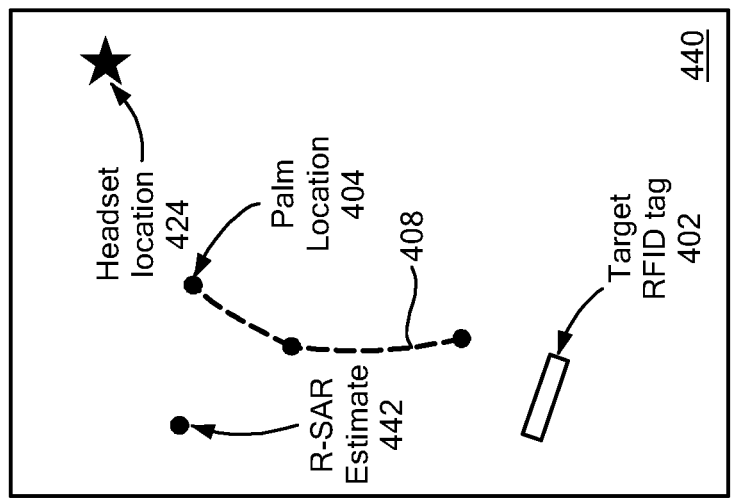
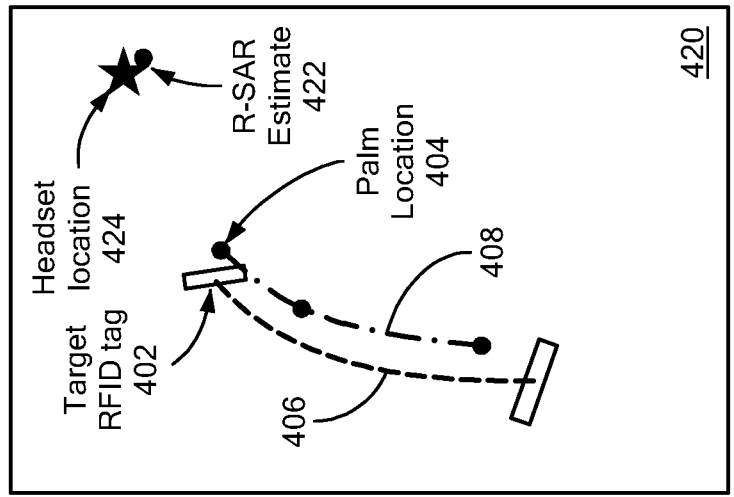
FIG. 4C
FIG. 4D
FIG. 4E

AUGMENTED REALITY WITH NON-LINE-OF-SIGHT PERCEPTION

CROSS-REFERENCE TO RELATED APPLICATIONS

This application claims the benefit under 35 U.S.C. § 119 of U.S. Provisional Patent Application No. 63/408,240 filed on Sep. 20, 2022, which is hereby incorporated by reference herein in its entirety.

STATEMENT REGARDING FEDERALLY SPONSORED RESEARCH

This invention was made with government support under CNS-1844280 awarded by the National Science Foundation. The government has certain rights in the invention.

BACKGROUND

There has been an increasing interest and investment in augmented reality (AR) systems. A significant driver for these investments is the role that AR systems are expected to play in boosting efficiency across sectors including manufacturing, warehousing, logistics, and retail. For example, in e-commerce warehouses, AR headsets can boost labor efficiency by guiding workers in picking, sorting, and packing orders and returns. Similarly, in manufacturing settings, AR headsets can guide employees by visualizing assembly tasks, automatically labeling tools in the environment, and helping users find parts they need. More generally, AR headsets are expected to make workers more efficient by annotating their environments, visualizing their next tasks, and guiding them in executing these tasks.

SUMMARY

There is a need for systems and techniques to enable AR headsets to deliver the above capabilities in real-world industrial environments, which are typically dense and highly cluttered. For example, a typical warehouse or dark store is dense with packages, and a standard manufacturing plant is dense with materials and compartments. In these environments, the majority of items may be occluded due to being inside a box, under a pile, or behind other packages. Such occlusions make it difficult for existing headsets to perceive these items, which in turn prevents them from identifying and locating the items or guiding workers towards them. This limitation stems from the fact that today's AR headsets perceive their environment through cameras or other vision-based sensing systems which are inherently limited to line-of-sight (LOS). Such line-of-sight restriction hinders AR systems from boosting worker efficiency where it is most needed, namely in cluttered and dense industrial environments.

The general concepts disclosed herein enable the design and implementation of AR systems that can sense fully occluded objects and expand the perception of humans beyond the line of sight. With this capability, AR goes beyond natural human ability to augment the way we interact with the world, enabling significant advances in warehouse logistics, manufacturing, retail, and more. For example, disclosed AR headsets with non-line-of-sight (NLOS) perception may be used to identify and localize specific items (e.g., customer orders, tools, materials) even when they are fully occluded, helping workers avoid a lengthy search process. Additionally, disclosed AR headsets may be used to automate inventory control of items in warehouses or retail stores without needing to see all objects, and can alert workers to misplaced items hidden behind occlusions.

To provide non-line-of-sight perception, systems and techniques described herein utilize radio frequency (RF) signals, which, unlike visible light, can traverse various occlusions such as cardboard boxes, plastic containers, wooden dividers, and clothing fabric. RF signals can be used to sense and accurately localize items in non-line-of-sight and highly cluttered environments. Embodiments of the present disclosure make use of ultra-high frequency (UHF) RFID (Radio Frequency IDentification) which have been widely adopted in supply chain industries.

According to one aspect of the disclosure, an AR headset with a built-in RF sensing system is provided. A user wearing the AR headset can freely walk in their environment (e.g., a warehouse or manufacturing plant), and the headset automatically identifies and localizes items in the environment, even when they are not the in line-of-sight. Using this information, the headset can guide the worker towards items of interest (tools, packages, etc.) and verify whether or not they have picked up the correct item.

As described in detail below, RF sensing can be integrated with AR headsets without impacting the performance of their existing sensors and displays (i.e., without obstructing the headset cameras or the user field of view) using an ultra-lightweight and wideband antenna that is conformal to the headset. Moreover, disclosed systems can operate with natural human mobility by allowing for accurate localization of RFIDs without requiring the user to perform unnatural movement patterns, which may hinder productivity. Rather, disclosed systems and techniques opportunistically leverage natural human mobility using visual information from the AR headset camera along with RFID measurements collected during the user's motion to create a synthetic aperture radar (SAR) and localize RFID tagged items with high accuracy. Further, disclosed systems can provide users with actionable tasks (e.g., guide the user where to search) and inform users of task success (e.g., verify to a warehouse picker whether or not they picked the right order) by leveraging the mobility of RFID tags to perform reverse SAR (R-SAR) to localize the headset with respect to the picked item's trajectory.

According to one aspect of the present disclosure, a mobile AR system can include: a receiver configured to receive radio frequency (RF) signals from one or more items located within an environment; a tracking module configured to generate tracking data responsive to a location of the system within the environment over time; a display device; and one or more processors. The processors can be configured to determine a location of at least one of the one or more items within the environment using the received RF signals and the tracking data, and generate a visual representation of the location of the at least one item for display on the display device.

In some embodiments, the display device can be a visor of an AR headset and the receiver is integrated into the AR headset. In some embodiments, the tracking module can be external to the AR headset. In some embodiments, the receiver can include a conformal antenna located about the visor of the AR headset. In some embodiments, the display device may be a screen of a mobile handheld device further comprising the receiver, tracking module, and one or more processors.

In some embodiments, the receiver can form a part of a transceiver further configured to transmit RF signals within the environment, and wherein the received RF signals are in response to the transmitted RF signals. In some embodiments, the received RF signals may be received from one or more RFID tags collocated with respective ones of the one or more items. In some embodiments, the one or more processors can be configured to determine the location of the at least one of the one or more items using synthetic aperture radar (SAR) with the tracking data used to obtain SAR antenna locations. In some embodiments, the one or more processors are configured to determine the location of the at least one of the one or more items using time of flight (ToF) between the transmitted RF signals and the received RF signals.

In some embodiments, the visual representation of the location of the at least one item can include at least one of: an arrow indicating the location of the at least one item, or a holographic sphere or ellipse indicating the location of the at least one item.

According to one aspect of the present disclosure, a conformal antenna for use with an augmented reality (AR) headset can include: one or more conductive surfaces configured to conform about a front surface of the AR headset and to receive radio frequency (RF) signals from one or more items located within an environment.

In some embodiments, the one or more conductive surfaces can be configured transmit RF signals within the environment, and wherein the received RF signals are in response to the transmitted RF signals. In some embodiments, the received RF signals may correspond to reflections of the transmitted RF signals off the one or more items. In some embodiments, the AR headset can include one or more sensors positioned about the front surface, wherein the one or more conductive surfaces are configured to conform about the front surface without substantially masking the one or more sensors. In some embodiments, the one or more conductive surfaces can include one or more tapers and one or more slots. In some embodiments, the received RF signals can include at least one of: ultra-high frequency (UHF) signals; WiFi signals; millimeter wave signals; or terahertz (THz) signals.

According to one aspect of the present disclosure, a method for verifying an item being picked up can include: receiving radio frequency (RF) signals from a plurality of items within an environment; receiving tracking data responsive to a location of an item being picked up over time; associating the item being picked up using the received RF signals and the tracking data; and verifying the item is a correct item to be picked up based on comparing the determined item identifier to an expected item identifier.

In some embodiments, the item can be tagged with an RFID tag, the receiver can perform reverse synthetic aperture radar (R-SAR) on the RF signals, and the association is performed by comparing the tracking data used to the R-SAR locations. In some embodiments, the method can further include generating user feedback in response to the verifying of the item. In some embodiments, the item can be being picked up by one of: a human hand; a robot gripper; or a grabber tool.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

For simplicity, embodiments of the present disclosure may be described in terms of environments/scenarios having a single RFID tag. However, the general concepts sought to be protected herein can be extended to multiple RFID tags in the environment. For example, using the EPC Gen 2 protocol, disclosed systems can read each RFID tag separately, and perform the same localization and verification algorithms for each tag. Moreover, while various embodiments are described in terms of providing NLOS perception for human users, the general concepts, techniques and structures sought to be protected herein can be applied to assist non-human users such as robots.

System

Figure 1:
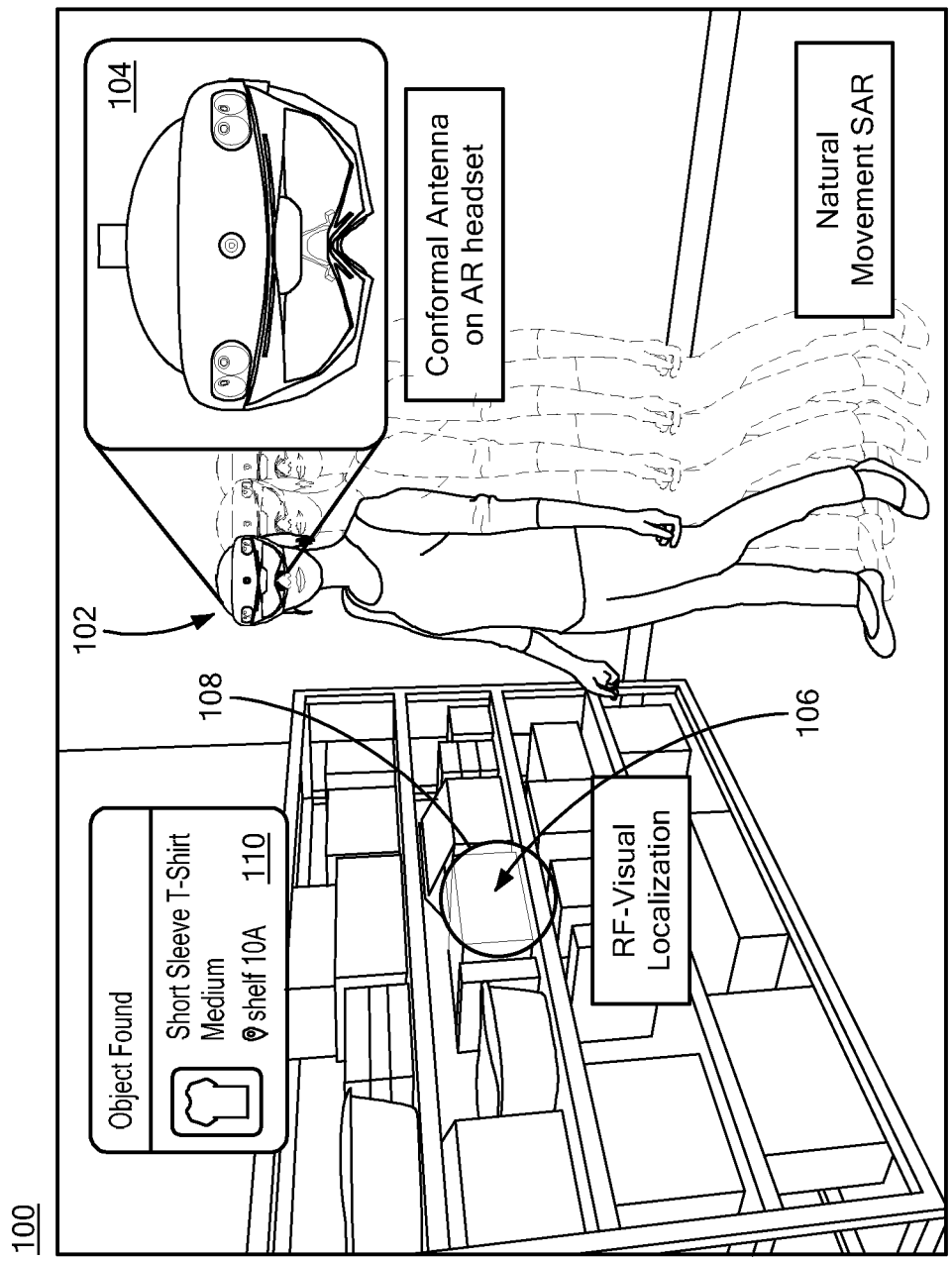
FIG. 1 is a pictorial diagram showing an example of a system for augmented reality with NLOS perception, according to embodiments of the present disclosure.

FIG. 1 shows a system 100 for augmented reality with NLOS perception, according to embodiments of the present disclosure. As shown, a user 102 may use an AR headset 104 to search for an item 106 (e.g., a shirt) that is occluded (e.g., the item may be located within a cardboard box). The headset 104 may use an RF antenna along with other sensors (e.g., a camera) to locate the item 106 and to present a user interface (UI) to assist the user 102 with locating the item. The RF antenna may be a conformal, light-weight antenna mounted on the headset 104. The UI may comprise one or more elements for localizing the item within an environment (e.g., a warehouse having many boxes arranged on shelves). For example, as illustrated in FIG. 1, headset 104 may project a holographic sphere 108 centered about the item's location within the environment to indicate which box or other type of container the item is located within. As another example, headset 104 may display a prompt 110 displaying information about the item 106, such as a picture of the item, a description of the item (e.g., "Short Sleeve T-Shirt," "Medium"), and a description of the item's location within the environment (e.g., "shelf 10A").

In some embodiments, headset 104 may obtain such item information from a database, such as inventory management system used by a warehouse, retail location, etc. For example, an application running on headset 104 may query an external database application for information about one or more items using their RFIDs.

AR-Conformal Antenna

Figure 2A:
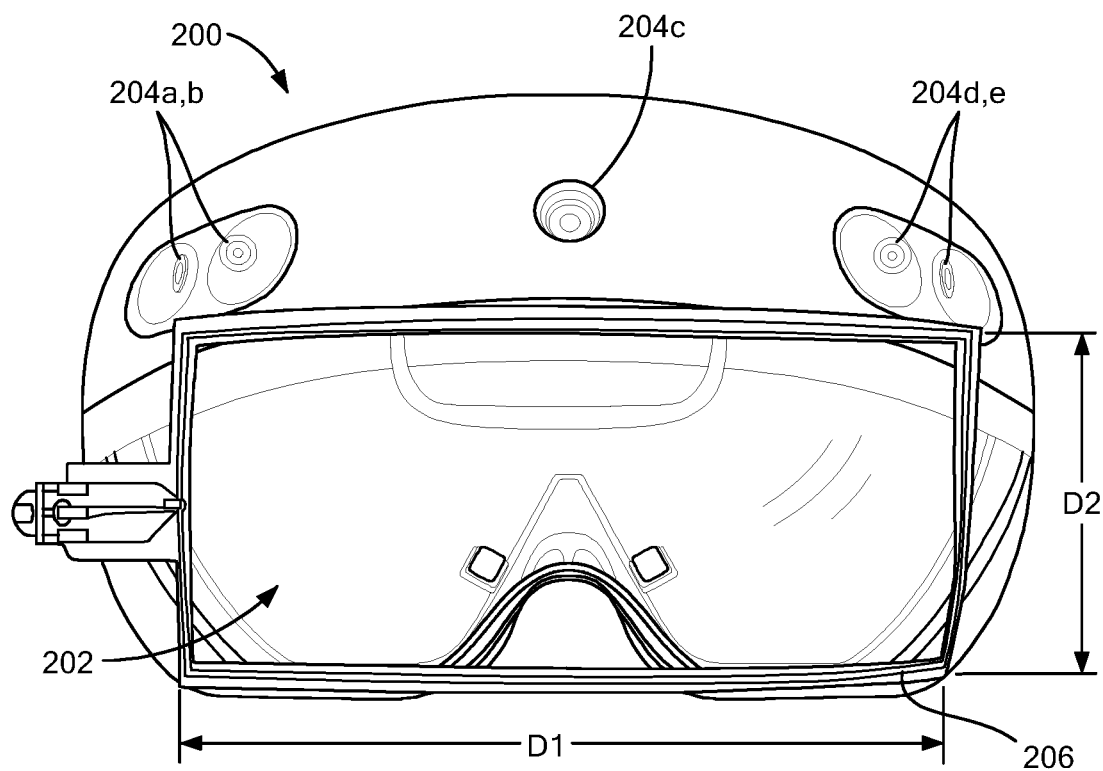
FIG. 2A is a front view of an AR headset having a fabricated single-loop antenna, according to some embodiments.
Figure 2B:
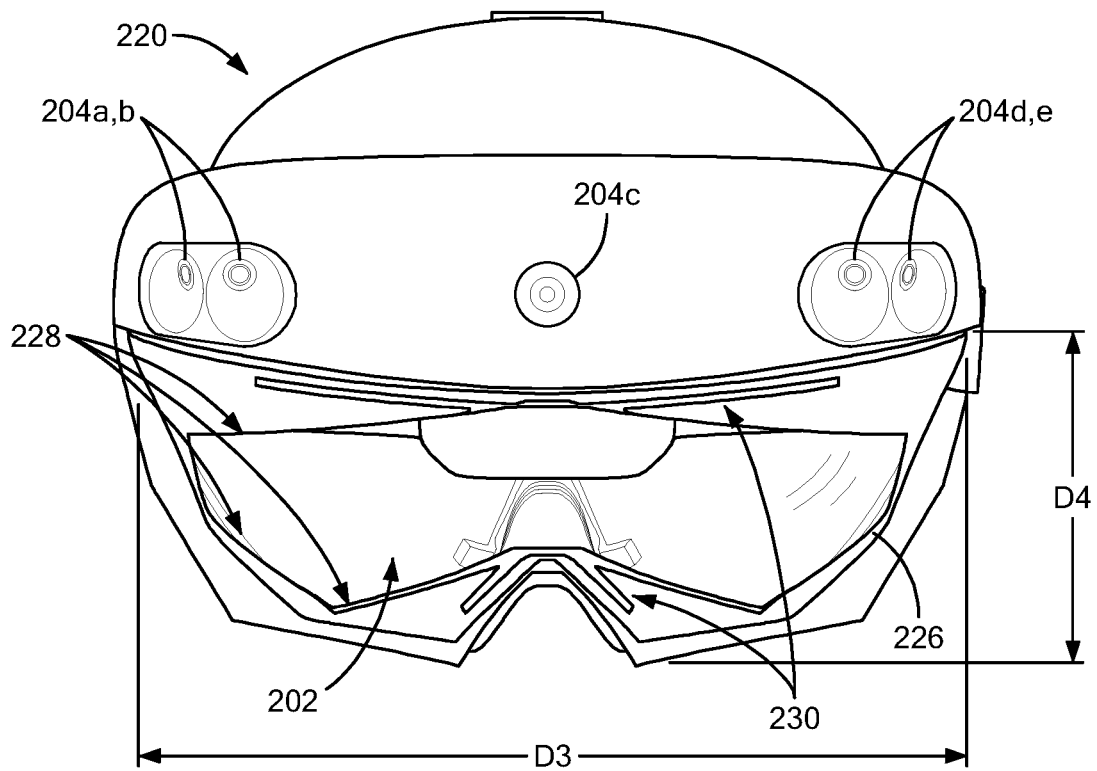
FIG. 2B is a front perspective view of an AR headset having a fabricated conformal antenna, according to some embodiments.

Turning to FIGS. 2A and 2B, embodiments of the present provide for and/or utilize a conformal antenna that can be mounted on the headset to identify, locate, and verify UHF RFID tags, without interfering with the headset's operation or constraining the user.

In general, to perform RFID localization from the headset in the field of view of the user, the antenna may be designed to satisfy certain requirements. First, the antenna may be designed for wideband operation around 900 MHz and to maintain a matched operation and a good gain over a BW of at least 200 MHz to match the bandwidth requirements of state-of-the-art RFID localization systems. Second, the antenna may be designed on a flexible substrate to easily conform to the AR headset's visor without obstructing a user's field of view or the cameras mounted on the front of the headset. Third, the antenna may be designed to be lightweight (e.g., less than 1 g) and to have a small form-factor such that is simple and easy to mount on the headset's visor.

FIG. 2A shows an AR headset with a single loop antenna design, according to some embodiments. Illustrative headset 200 can include a display integrated within a transparent visor 202, various types of sensors including but not limited to cameras 204*a-e*, one or more processors, memory, and one or more wireless network adapters (e.g., WiFi, Bluetooth, cellular). Headset 200 may include one or more sensors for tracking orientation, position, and movement of the headset (and thus the user), such as a 3-axis accelerometer, gyroscope, and a GPS receiver.

These various hardware components may be utilized/controlled by AR firmware/software running on the headset 200. In more detail, headset 200 may be configured to run one or more applications that can interface with the various hardware components using one or more application programming interfaces (APIs) provided by the headset 200. At least one such application may be configured to provide AR with NLOS perception using the concepts, structures, and techniques disclosed herein. In some cases, headset 200 may be provided as a MICROSOFT HOLOLENS headset and the application may be a HOLOLENS application. The application can be developed using a framework (e.g., UNITY) that provides/enables various functionality described herein, such as communicating and receiving information to/from edge server, querying cloud or local RFID/item database, displaying visual holograms, etc.

A single loop antenna 206 can be mounted (e.g., using an adhesive) on front face of the headset 200. The loop may be designed to substantially wrap around the permitter of visor 202, delivering a small form factor not obstructing its field of view.

The antenna shape and dimensions may be selected based on the dimensions of the headset's visor and operating requirements. To identify suitable antenna dimensions corresponding to an operation around a given frequency (e.g., 900 MHz), antenna simulations can be performed using, for example, ANSYS High Frequency Simulation Software (HFSS). In one example, antenna 206 can have a generally rectangular shape with width (D1) of about 122 mm and height (D2) of about 51 mm.

In some embodiments, antenna 206 may be fabricated on a thin (e.g., 100 μm) polyimide substrate. Polyimide films are commonly used for applications requiring flexible electronics, provide good electromagnetic properties, and are widely availability at low-cost. Illustrative antenna 206 may be designed to weigh less than 1 g. Of note, a single loop antenna that does not require a ground plane, making it easy to mount on an AR headset.

FIG. 2B shows an example of a fabricated conformal antenna 226 mounted on an AR headset 220 that may otherwise be the same as or similar to headset 200 of FIG. 2A. In contrast to the rectangular design of FIG. 2A, conformal antenna 226 includes tapering (e.g., tapered edges 228) and slotting (e.g., slots 230). Antenna 226 may comprise one or more conductive surfaces for transmitting and receiving RF signals. It is appreciated herein that tapering (i.e., gradually changing the width of the loop) and slotting (i.e., adding slotted gaps in the loop) can be used to achieve increased/desired bandwidth.

Similar to the design of FIG. 2A, conformal antenna 226 may be designed to have a lightweight, small form factor that does not substantially obstruct the field of view of headset visor 202. For example, antenna 226 may be fabricated on a thin (e.g., 100 μm) polyimide substrate (or other conductive material with suitable electromagnetic properties) and designed to weigh less than 1 g.

The shape and dimensions of antenna 226 may be selected based on the dimensions of the headset's visor and operating requirements. To identify suitable antenna dimensions corresponding to an operation around a given frequency (e.g., 900 MHz), iterative design and simulation processing can be performed (e.g., using ANSYS HFSS for the simulations). In one example, antenna 206 can have a width (D3) of about 165 mm and height (D4) of about 64 mm.

Of note, the antenna design of FIG. 2B has dimensions chosen to match the shape of the visor, without blocking any of the cameras (e.g., cameras 204*a-e*). Tapers 228 are included around the outline of the antenna and integrated slots 230 are included on the top and bottom lines around the nose to achieve a wideband operation. The dimensions of the tapers 228 and slots 230 may be selected to achieve desired antenna operation (frequency, BW, gain, etc.). In one example, slots 230 may be 1.5 mm wide. In one example, tapers 228 along the bottom of the visor can be 34 mm in length with an angle of 20°. In one example, tapers 228 along the top of the visor can be 55 mm in length with an angle of 13°.

It should be noted that while illustrative antenna 226 was designed to match a particular headset, the general design concepts disclosed herein can be adapted for different visor shapes, depending on the location of the cameras and other components that cannot be blocked.

Figure 2C:
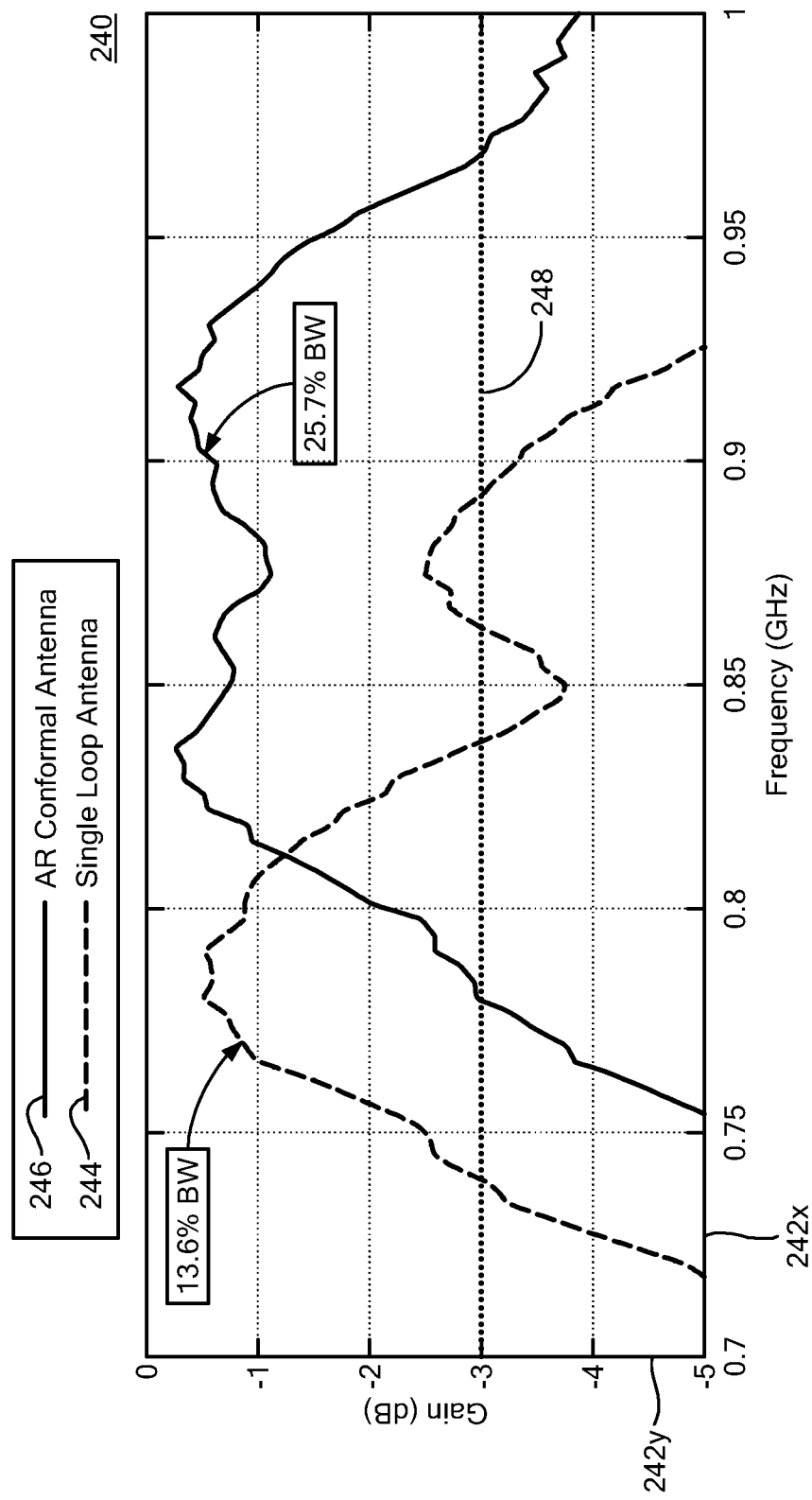
FIG. 2C is a plot diagram illustrating gains that may be achieved using the antenna of FIGS. 2A and 2B.

FIG. 2C shows examples of gains that may be achieved using the antenna of FIGS. 2A and 2B. Illustrative graph 240 includes a horizontal axis 242x representing frequency (GHz), a vertical axis 242y representing gain (dB), a first plot 244 corresponding to measured gains of the single loop antenna design (FIG. 2A), and a second plot 246 corresponding to measured gains of the conformal loop antenna design (FIG. 2B). Horizontal line 248 is used to highlight the 3 dB bandwidth.

Plot 244 was generated by mounting the single loop antenna (FIG. 2A) on the headset, worn by a user, and measuring its gain over frequency of interest. This was done by illuminating it with a transmitter antenna of a known gain and using a vector network analyzer (VNA) to extract the S parameters of the loop antenna (specifically the S21 parameter). As shown, the single loop design may achieve 3 dB bandwidth of approximately 100 MHz around 780 MHz.

Plot 246 was similarly generated by conducting gain measurements to assess the 3 dB bandwidth of the conformal antenna (FIG. 2B) while mounted on the headset and worn by the user. Plot 246 shows the gain of the conformal antenna as a function of frequency. Notice how the 3 dB bandwidth of the gain is about 200 MHz. This shows that the disclosed conformal antenna achieves the desired gain pattern in the frequency range of interest. One reason for this is that the conformal antenna simulates the structure on plexiglass that mimics the headset's visor.

It is appreciated herein that the negative gain realized by these wearable antennas is normal with ultra-thin substrates due to close proximity with lossy material such as the headset and human tissues. In some embodiments, such negative gain may be overcome by increasing transmit power, thus maintaining a constant effective radiation pattern (typically referred to as EIRP).

Various non-limiting implementations that may be applied to headset 200 of FIG. 2A and/or headset 220 of FIG. 2B are now described. The conformal RF antenna may be mounted on the front visor of the AR headset and connected to one or more radios (e.g., two Nuand BladeRF 2.0 Micrsoftware radios). To obtain wideband RFID channel measurements for localization, the EPC Gen 2 protocol may be implemented on a wideband RFID reader design, similar to "Rfusion: Robotic grasping via rf-visual sensing and learning" by Tara Boroushaki et al. in "Proceedings of the 19th ACM Conference on Embedded Networked Sensor Systems," pages 192-205, 2021. In order to transmit and receive signals from a single antenna, a circulator (e.g., a CS-0.900 circulator) may be introduced to the reader. To cancel self-interference and extend the range, over-the-wire nulling may be implemented, for example, through the BladeRF's MIMO capability and a ZAPD-2-21-3 W-S+2-Way Pass DC Splitter. The reader may be connected to a microprocessor (e.g., a Raspberry Pi) to collect and process RFID measurements from the software defined radios.

In some embodiments, processing described herein may be implemented on an edge server. The code can be developed in Python and C++ and may use ROS to enable multicore processing. An AR headset application (e.g., a HOLOLENS application) can be implemented to stream device transforms and tracked hand locations to the edge server via TCP protocol and present the designed UI to the user. The headset application can be developed in C # in Unity3D and Visual Studio IDE. On the Raspberry Pi, code may be implemented in Python to stream the processed RFID channel estimates to the edge server.

In other embodiments, the entire RF sensing hardware can be integrated into a headset. In particular, the previously described software radios and microprocess may be designed in form factors similar to existing RFID reader chips (e.g., Lepton3 that are around 1"×1"×0.1"), thus small enough to fit into AR headsets.

While embodiments of the present disclosure relate to the use of an AR-conformal antenna, other designs are possible such as placing the antenna on top of the headset, on the user's shoulder, or even in the user's hand.

In some embodiments, to increase transmit power, an existing wrist-worn RFID reader may be leveraged to power RFID tags in the environment.

While embodiments of the present disclosure may be described in terms of using ~900 MHz RF signals for locating items, various types of RF signals can be used including but not limited ultra-high frequency (UHF) signals; WiFi signals; millimeter wave signals; or terahertz (THz) signals.

RF-Visual Synthetic Aperture Radar

Figure 3A:
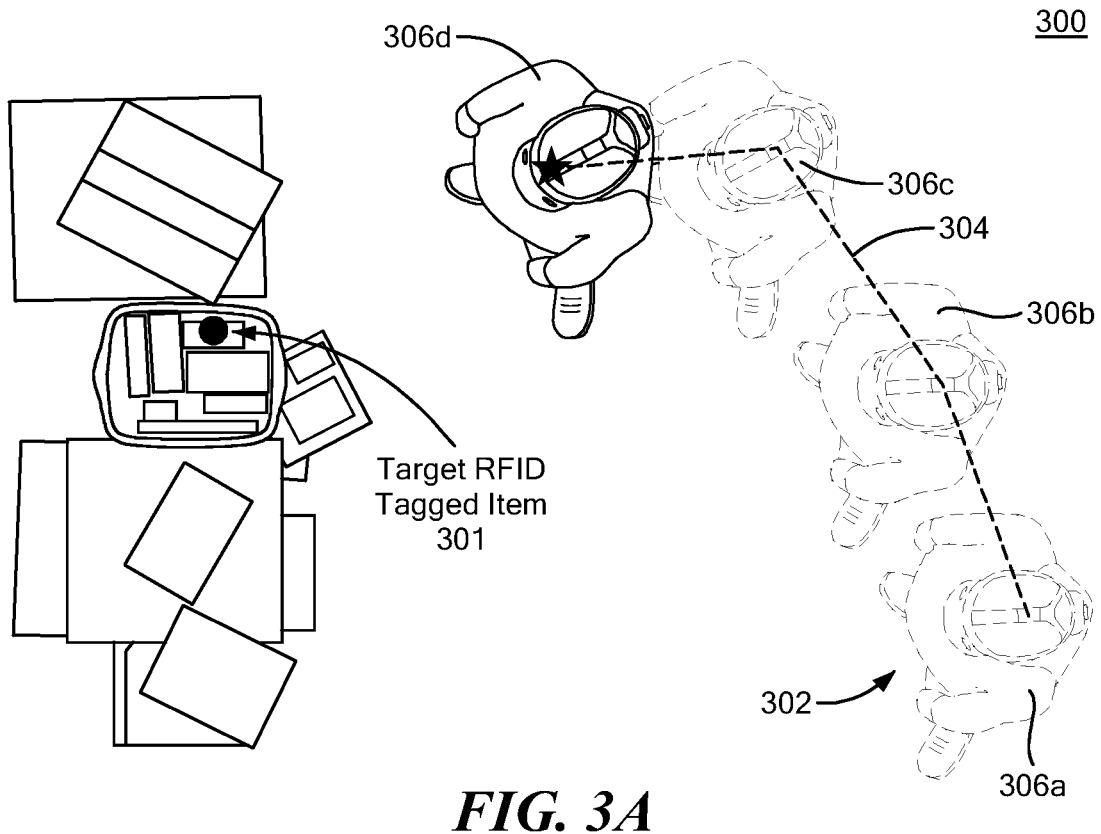
FIG. 3A pictorial diagram illustrating the use of two-dimensional (2D) SAR for localizing a tagged item, according to some embodiments.
Figure 3B:
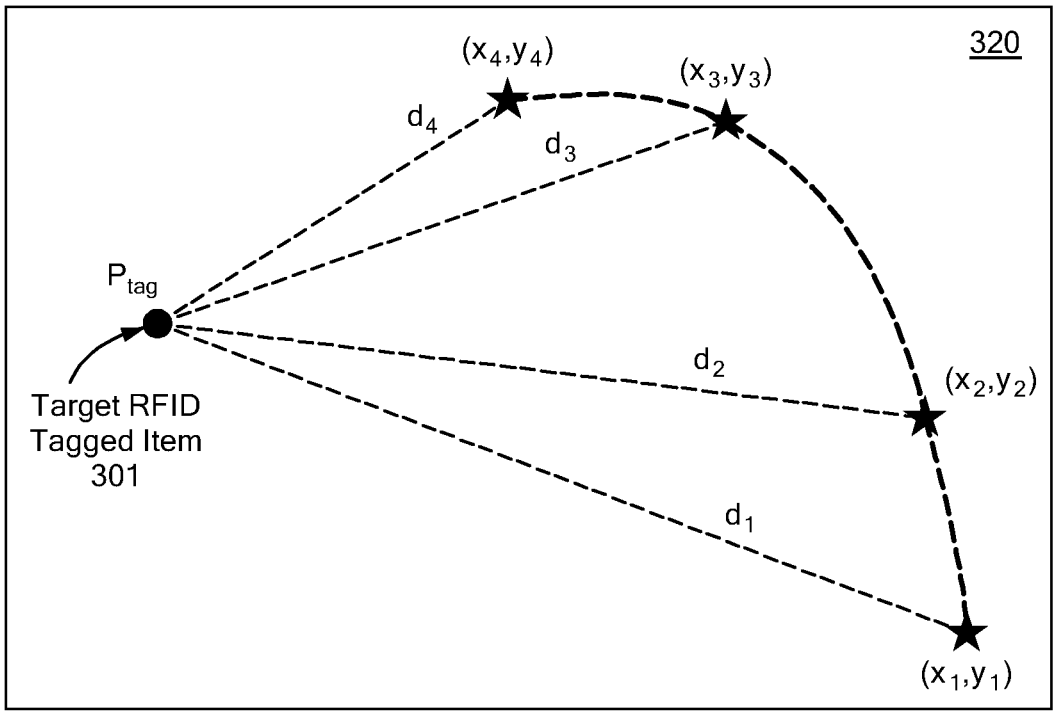
FIG. 3B is a diagram of a heatmap that may be generated from the use of the 2D SAR, such as in FIG. 3A, according to some embodiments.
Figure 3C:
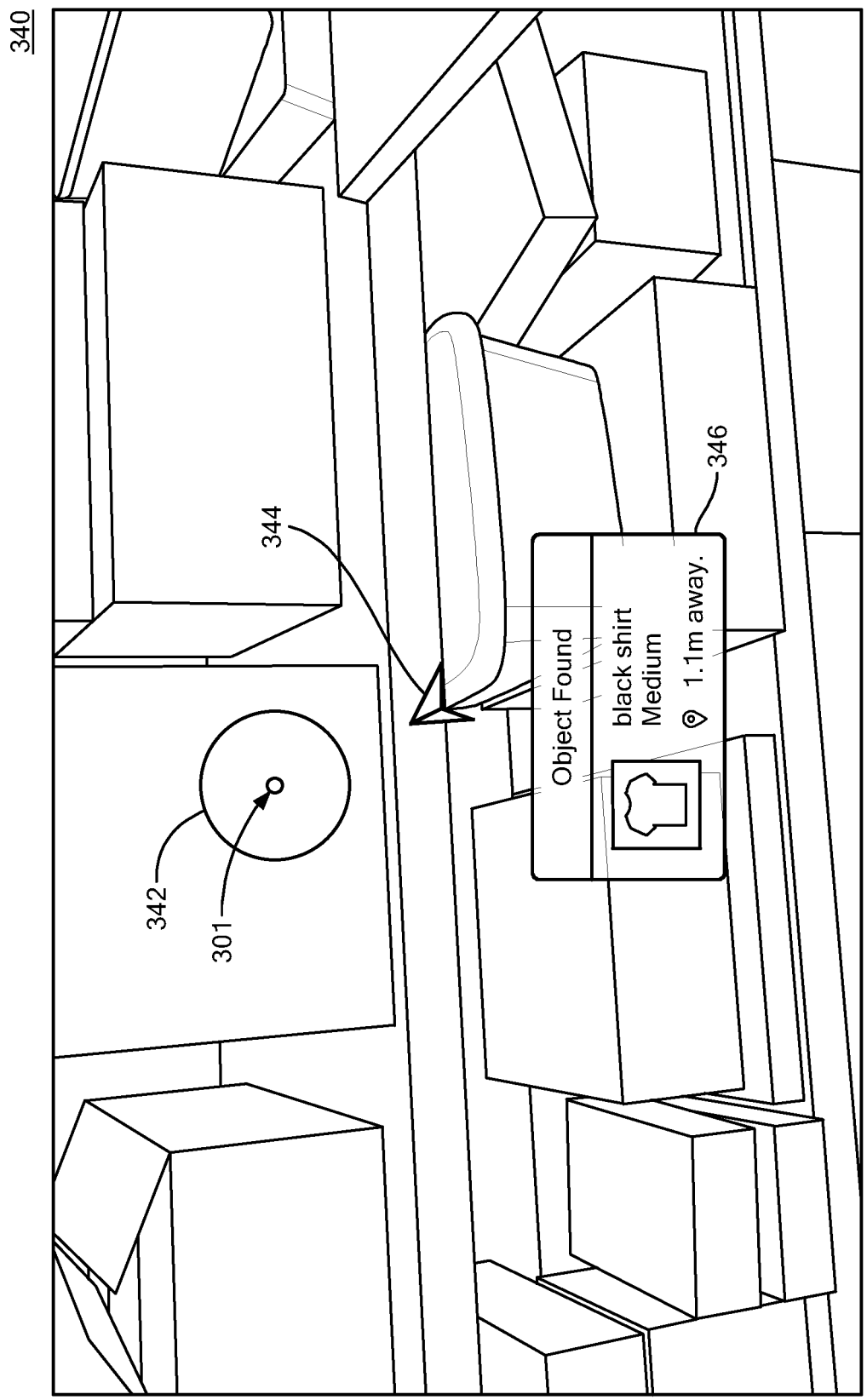
FIG. 3C is a pictorial diagram showing a view that may be presented on an AR headset in response to localizing an item, according to some embodiments.

Turning to FIGS. 3A-C, next described is how an AR headset (e.g., headset 220 of FIG. 2B) can use RFID measurements (e.g., such as measurements obtained using the AR-conformal antenna 202), along with visual information from the AR headset's camera to locate RFID tags with high accuracy through a technique referred to herein as RF-Visual Synthetic Aperture Radar (SAR).

At a high level, SAR leverages the same localization principle as antenna arrays, where measurements from multiple antenna locations are combined to localize a wireless device in 2D or 3D space. SAR differs from standard antenna arrays in that it moves a single antenna, collecting measurements from different physical locations to emulate an antenna array. Formally, one can estimate the power P received from every point in space using the following equation:

$$P(x, y, z) = \left\| \frac{1}{M} \frac{1}{N} \sum_{j=1}^{M} \sum_{i=1}^{N} h_{i,j} e^{\frac{4\pi d_i(x,y,z)}{\lambda_j}} \right\| \quad (1)$$

where M is the number of frequencies used, $h_{i,j}$ is the channel measurement of the location with the $j^{th}$ frequency, $d_i$ is the distance from (x,y,z) to the $i^{th}$ location, and $\lambda_j$ is the wavelength of $j^{th}$ frequency, and N is the number of antenna locations.

To localize a tag associated with a target item, one can find the (x,y,z) location with the highest power. Formally, the location of the tag, $p_{tag}$:

$$p_{tag} = \text{argmax}_{(x,y,z)}(P(x,y,z)) \quad (2)$$

Since it may be infeasible to mount an antenna array on an AR headset, embodiments of the present disclosure utilize SAR-based RFID localization. Specifically, disclosed AR systems opportunistically leverage natural human motion to collect wideband measurements from different locations and use them to construct a synthetic aperture radar to localize RFID tagged items.

It is recognized herein that, unlike prior systems that leverage SAR (e.g., robots or airplanes), an AR system cannot rely on a constant velocity or predictable trajectory. For example, humans naturally accelerate and decelerate and move slightly side-to-side as they walk, making it difficult to predict the exact antenna location.

To address these challenges and localize the antenna over time, disclosed systems and techniques may leverage the AR headset's built-in self-tracking capability. Existing AR headsets can self-localize by extracting feature points from their cameras' visual data and performing visual-inertial odometry (VIO). They then track these points over time to build a map of the environment and derive their 6D pose (i.e., location and rotation) within this map.

To leverage this built-in localization, disclosed AR systems may perform an additional transformation. Specifically, the headset tracks its location as the center of the user's head, but the antenna may be mounted on the front of the visor (such as illustrated in FIG. 2B). This transform is important since SAR relies on small changes in the RFID channel and therefore requires precise locations. This transform can be formulated as:

$$^{W}P^{A} = {^{W}R^{H}} \times {^{H}P^{A}} + {^{W}P^{H}}$$

$$^{W}R^{A} = {^{W}R^{H}} \quad (3)$$

where $^{W}P^{A}$ and $^{W}R^{A}$ are the position (x,y,z) and quaternion rotation of the antenna in the world frame W; $^{W}P^{H}$, $^{W}R^{H}$ are the position and quaternion rotation of the AR headset in the world frame. The x,y,z translation from the headset H to the antenna A is defined as $^{H}P^{A}$. The position and rotation of the headset are obtained from the vision-based AR self-tracking. The translation from the headset's center to antenna ($^{H}P^{A}$) can be empirically measured since this translation is fixed and results from mounting the antenna on the headset. In some embodiments, $^{H}P^{A}$ may be determine prior to operation of an AR headset and hardcoded or stored as a parameter within the headset.

After applying the previously described transformation, disclosed AR headsets can use them as the antenna array locations. This allows them to then exploit wideband measurements as per Eq. 1 to opportunistically apply SAR along the user's trajectory.

FIGS. 3A-3C show an example of RFID localization that may be performed according to embodiments of the present disclosure. For example, the illustrated localization technique (shown in 2D for simplicity) may be performed by AR headset 220 of FIG. 2B.

FIG. 3A shows an overhead view of a user 302 walking through the environment 300 to locate a target RFID-tagged item 301. RFID measurements are taken during the user's trajectory 304, resulting in the measurement locations shown by stars 306a-d in the figure. These measurements can then be used to compute the power at various points (e.g., all points) within environment 300 using Eq. 1 to estimate the tag's location.

FIG. 3B shows this power as a heatmap 320 with lighter colors indicating areas of higher power and darker colors indicating areas of lower power. The location of the RFID-tagged item 301 overlaps with the area of highest power, showing that the localization was successful. While the above description focused on 2D localization, the same method extends to 3D as per Eq. 2, enabling disclosed AR systems to localize items in 3D space.

The above example showed how RF-Visual SAR can be leveraged to locate RFID tags in 2D by opportunistically leveraging human motion. As previously mentioned, SAR localization can also be extended to 3D. However, 3D localization may introduce a symmetry problem. Specifically, since the antenna is mounted near the user's head, and the user is unlikely to move vertically while they are walking, all antenna locations will be in the same plane parallel to the floor. For example, two possible tag locations that are symmetric around the measurement plane will have similar distances to each measurement location. Therefore, these two locations will have the same measured power in Eq. 1. This creates a symmetry in the RF-Visual SAR that makes it difficult for an AR headset to differentiate whether a tag is above or below the user's head. This symmetry is a known problem for planar antenna array systems, and can be overcome by designing different SAR patterns such as those with elevation change. However, doing so for an AR mounted headset may be undesirable since it may require users to perform uncomfortable movements like crouching or jumping.

In some embodiments, to overcome this challenge, the radiation pattern of the AR-conformal antenna can be exploited. The gain of the antenna is strongest in front of the visor, as opposed to above or below it. Therefore, if the tag is above the user's head, then the RFID tag response should have a higher signal-to-noise ratio (SNR) when the user's head is tilted upwards (i.e., toward it) than when the user's head is tilted downward. To mitigate multipath scenarios, multiple measurements can be collected over time and space. The opposite is true for tags below the user's head.

For each measurement, the AR headset can use the 6D pose (derived from the headset's visual positioning) to determine if the user is looking up or down. Next, it computes the average SNR across all measurement locations and all frequencies where the user was looking up and where they are looking down. If the average SNR for measurements where the user was looking up is greater than when she was looking down, then the headset determines that the tag is above the user, and vice versa. The headset then only computes Eq. 1 for locations that are on the correct side of the measurement plane, eliminating any symmetry ambiguity caused by the natural human motion.

FIG. 3C shows a view 340 that may be presented on an AR headset in response to localizing target item 301, according to some embodiments. Once the item 301 has been localized, holographic visualization can be used to display its location to the user and guide them towards it. To do this, the headset can leverage the transforms described in Eq. 3 to compute the target item's tag's location in the world frame. View 340 may be presented, for example, by a HOLOLENS application or other AR application configured to provide NLOS perception according to the concepts, structures, and techniques disclosed herein.

In this example, a spherical hologram 342 is placed around the estimated location of target item 301, and a floating arrow 344 is displayed to guide the user towards the localized tag for object retrieval. The size of the sphere 342 may be determined by the confidence interval from RFID localization accuracy which may be, for example, around 10-20 cm. Arrow 344 may be programmed to float slightly above the user's eye level at a fixed distance in front of them. For every frame update, the AR application queries the location and rotation of the user in the world space. It then computes their directionality to update the pointing vector of the arrow to properly guide the user towards the target item 301. In addition, view 340 may display prompt 346 with information about the target item 301.

Some practical considerations are now addressed. Standard wideband SAR systems typically design their antennas to have uniform gain across the entire frequency band. However, off-the-shelf UHF RFID tags are not designed to be wideband and therefore have significant variability in their antenna gain across frequency. In general, measurements with frequencies further from the tag's resonant frequency (typically 900 MHz) will be weaker and therefore more susceptible to noise. These weak measurements can introduce significant error in the location estimate. To overcome this, embodiments of the present disclosure may use a weighted SAR formulation that biases the estimation towards confident measurements to improve the accuracy. To do this, the AR system can start by quantifying its confidence in each of its measurements using the signal-to-noise ratio (SNR). For any wideband measurement with an average SNR below a certain threshold, the system is unlikely to be able to accurately estimate the RFID channel and it therefore removes the measurement from the SAR formulation entirely. The remaining measurements all contain useful information, however, as described above, certain frequencies in each wideband measurement may have weaker responses due to the tag's frequency dependent response. To prioritize frequencies with stronger responses, an SNR-based weighting function can be applied to each frequency in a measurement.

This is formalized in the following equation:

$$P(x, y, z) = \left\| \sum_{j=1}^{M} \sum_{i=1}^{N} \begin{cases} w_{i,j} h_{i,j} e^{\frac{4\pi d_i}{\lambda_j}} & \overline{SNR_i} > \tau \\ 0 & \overline{SNR_i} < \tau \end{cases} \right\| \quad (4)$$

$$w_{i,j} = \frac{SNR_{i,j}}{\max_{k \in [1,M]} (SNR_{i,k})} \quad (5)$$

where $w_{i,j}$ is the weight for the $i^{th}$ location and $j^{th}$ frequency, and r is the SNR threshold for removing poor measurements. $SNR_{i,j}$ is the SNR of the $i^{th}$ location with the $j^{th}$ frequency, and $\overline{SNR_i}$ is the average SNR across all frequencies for the $i^{th}$ location. (When computing $w_{i,j}$ in some implementations, all of the SNR values may be offset and clipped at 0 to avoid negative weights.)

A few additional points are noted. First, in practice, the self-localization frame rate is different from that of the RFID channel measurements. To overcome this, an AR system according to the present disclosure can linearly interpolate between headset self-tracked locations to find the corresponding location of the mounted antenna for any given measurement. Second, the AR system can continue to collect measurements until it has become confident in the tag's location. To determine its confidence, it can find all (x,y,z) locations whose power is within X-dB of the peak power, where X is a predefined threshold (e.g., X=0.75). Other thresholds are possible, but a looser threshold may reduce the confidence and hence the localization accuracy. The AR system then computes a bounding box around these locations. When this bounding box's size falls below a threshold, it declares the localization complete and visualizes the location.

RF-Visual Verification

Turning to FIGS. 4A-E, thus far it has been explained how an AR system can opportunistically leverage human motion to localize RFID-tagged target items and visualize them for retrieval. In principle, this visualization should be sufficient to indicate to the user to pick up the item (e.g., within the holographic sphere 342 of FIG. 3C). In practice, however, the user may still pick up an incorrect item. For example, multiple items may lie within the sphere or other visual indicator. Even if the user knows what they're looking for (e.g., red shirt), there might be several items that are visually similar to each other or in similar packaging in the region. More generally, the picked item may be incorrect because the picker is prone to human error. To ensure that the user has picked up the correct item, some embodiments can incorporate a mechanism for picking verification, referred to herein as RF-Visual Verification.

RF-Visual verification can be used to verify whether the correct item is in the user's hand after they have picked up an object. Said differently, it localizes the RFID-tagged target item to within the user's palm (or, in the case of a non-human user, a robotic gripper or grabber tool). It is appreciated herein that this localization problem is fundamentally different from the one previously described. Unlike the earlier scenario where the user's walking emulates synthetic aperture, a user picking an item is in a relatively fixed location. To localize the item despite the user's stationary position, embodiments of the present disclosure leverage the tag's mobility instead.

Figure 4B:
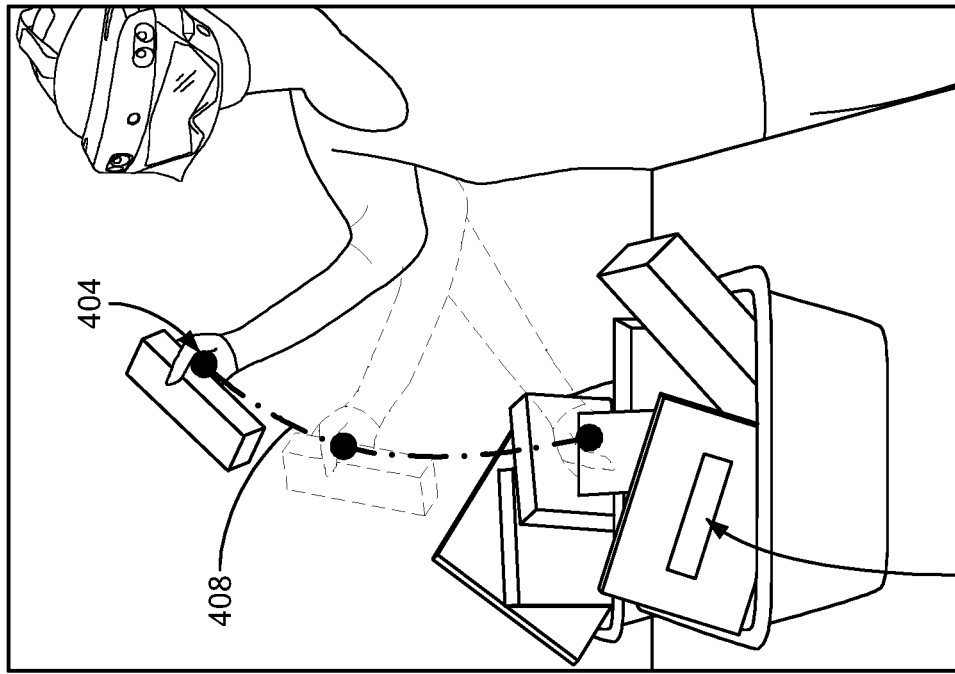
FIGS. 4A and B are pictorial diagrams illustrating the use of R-SAR for in-hand item verification, according to some embodiments.
FIGS. 4C-E are diagrams of heatmaps that may be generated from the use of R-SAR, such as in FIGS. 4A and B, according to some embodiments.
Figure 4A:
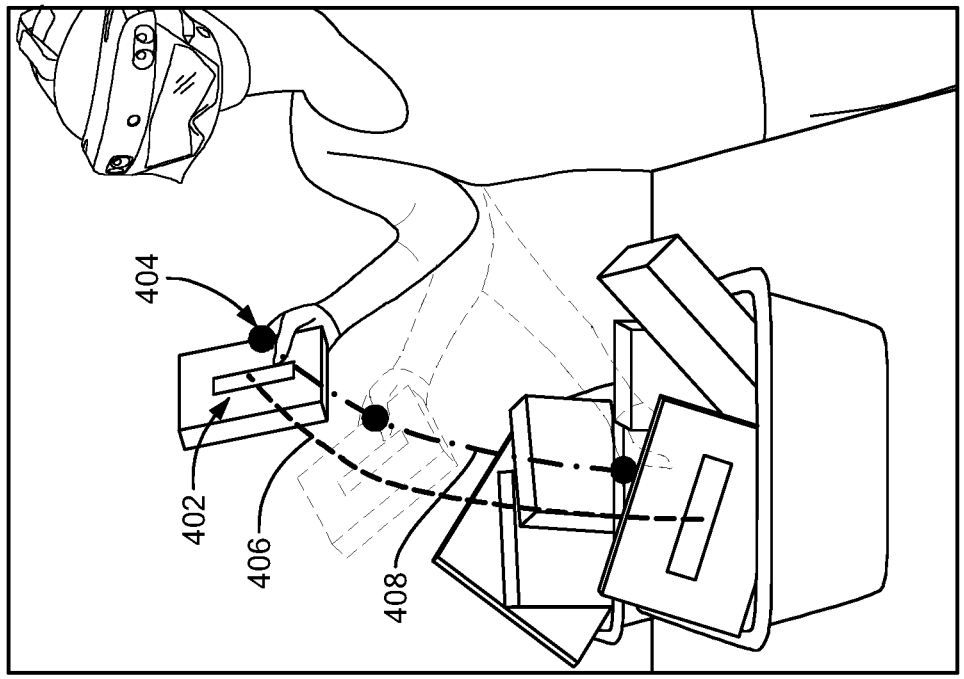

FIG. 4A show a sample scenario, demonstrating how the tag 402 itself traces an antenna array when being picked up in a user's hand 404. As can be seen, the tag trajectory 406 is similar to the plan trajectory 408 when it is in-hand. In some embodiments, this emulated array can be used to localize the AR-headset (more specifically, the antenna on the headset) with respect to the array. This formulation is the reverse of the SAR described above, where the tag was stationary, and the AR conformal antenna on the headset was moving with the user. Notably, with the previously described SAR technique, the AR headset's self-tracking capability can be leveraged to track the antenna locations. Here, a different mechanism may be used to track the tag locations in order to properly apply the antenna array equations. In some embodiments, the hand-tracking capability of the AR headset may be used to track the location of tag 402 as it moves. Specifically, AR headsets like the MICROSOFT HOLOLENS 2 can detect and track multiple feature points on a user's hand, including their palm. Thus, if the user picks up the correct RFID-tagged item, then the tag traces a similar trajectory to the user's palm as shown in FIG. 4A.

Embodiments of the present disclosure (e.g., headset 220 of FIG. 2B) can leverage the above observation and apply the antenna array equations on the palm's trajectory 408 in order to localize the headset. If the headset's estimated location using this method coincides with the headset's visual-inertial odometry-based location, that indicates that the target RFID tagged item was accurately retrieved and is indeed in the user's hand. On the other hand, if the headset localization fails, the failure indicates that the target RFID tag is not in the user's hand.

FIG. 4A shows an example where the target item is in the user's hand. Here, the palm location ($P_{palm}$) and the tag location ($P_{tag}$) are similar. As the user's hand moves, $P_{palm}$, and $P_{tag}$ change similarly together. As a result, the target tag's location can be accurately approximated with the palm location over time for applying SAR and estimating the AR conformal antenna's location according to the following equation:

$$P(x, y, z) = \left\| \sum_{j=1}^{M} \sum_{i=1}^{N_v} h_{ij} e^{\frac{4\pi d(t_i)}{\lambda_j}} \right\| \quad (6)$$

$$d(t_i) = |(x, y, z) - P_{palm}(t_i)| \quad (7)$$

$$(x_h, y_h, z_h) = \max_{x,y,z} P(x, y, z) \quad (8)$$

where $N_v$ is the number of measurements, $t_i$ is the time of $i^{th}$ measurement, d ($t_i$) represents the distance at time $t_i$ from the (x, y, z) position to the user's palm location, $P_{palm}$ ($t_i$). An AR headset can obtain $P_{palm}(t_i)$ through vision-based hand tracking. The SAR estimated headset location, ($x_h$, $y_h$, $z_h$), is the position that emanated the maximum power. Remember that when the user has the target item in their hand, $P_{palm}(t_i)$ is similar to the target RFID location at time $t_i$.

FIG. 4C shows the result of applying SAR in the scenario of FIG. 4A to localize the headset in the form of a 2D heatmap from a side view. For simplicity, the result of antenna array projections is sliced in the plane that coincides with the real-world plane containing the user's body and the RFID-tagged item. In this heatmap 420, lighter colors indicate higher probability of the headset location, while darker colors indicate low probability. As the figure shows, the location of highest power 422 is close to the actual location of the headset antenna 424, indicating that the headset has been accurately localized. In this situation, the AR system can determine that the target item is in the user's hand and take some action in response (e.g., displaying a text-based notification that the target item is retrieved).

FIG. 4B shows a scenario where the user picks an incorrect item. Here, the location of user's palm 404 ($P_{palm}$) changes as the user's hand moves (trajectory 408), but the location of the target RFID tag 402 ($P_{tag}$) does not change. In this case, when the user's palm location is used to estimate the tag location for the SAR, it will fail to accurately locate the AR conformal antenna location.

FIG. 4D shows the result of applying SAR in the scenario of FIG. 4B. Notice how heatmap 440 displays multiple high probability regions that are far from the actual headset location. In this case, the highest probability location 442 which corresponds to the SAR-based estimate of AR conformal antenna's location is far from the actual location of the headset antenna 424. Thus, the SAR-based headset localization fails because of large error. Since the headset knows its actual location (using the self-tracking via visual-inertial odometry as previously described), it can determine that the reverse localization has failed, and use this information to determine that the target RFID tag is not in the user's hand.

In some embodiments, the criteria for declaring that the target tag is in the user's hand is that the headset localization error should be within an acceptable range and can be formulated as follows:

$$\|(x_h, y_h, z_h) - (x_G, y_G, z_G)\| < \tau \qquad (9)$$

where $(x_G, y_G, z_G)$ is the headset's location based on built-in odometry, and x is threshold for localization error. In one example, $\tau$ is 0.3 m, which may achieve a good balance between precision and recall. In some examples, the length of the AR-conformal antenna is 0.165 m.

The above description assumes that the user's head is still as they are picking an item. In practice, a user's head naturally tilts during picking, and it is important to compensate for these tilts in the reverse SAR localization. As a result of head movement throughout the retrieval process, the distance of user's palm to headset's initial location can be different from the actual distance from the user's palm to the headset's antenna location.

FIG. 4C shows result of SAR after compensation. For comparison, FIG. 4E shows the result of applying SAR without compensating for the user's natural head movements. Multiple high probability regions are visible in heatmap 460 showing that if the natural head movements are not accounted for, the SAR estimated head location may have a large error and the item in the user's hand may be incorrectly classified (i.e., highest probability location 462 is relatively far away from the headset location 424).

To address this issue, some embodiments may track such natural head movements through the visual-inertial odometry and compensates for them in the RF-Visual SAR formulation. Specifically, the palm position can be translated from current headset coordinate to the initial headset coordinate. This can be formulated by replacing d ($t_i$) in Eq. 6 with $d(t_i)$ as follows:

$$\hat{d}(t_i) = |(x, y, z) - (P_{palm}(t_i) - [P_{head}(0) - P_{head}(t_i)])|$$

where $P_{head}(t_i)$ is the visual-inertial odometry-based head location at time $t_i$. In this new formulation, $\hat{d}(t_i)$ represents the compensated distance from head's initial position to the palm location at time $t_i$. The headset's estimated initial location, $P_{head}(0)$, is the same as $(x_G, y_G, z_G)$ in Eq. 9. The same criteria as Eq. 9 can be used for the headset's initial location to determine if the target item is accurately retrieved by the user.

In some embodiments, camera visual data may be used to determine if and when the user grasps an item by tracking her hands and fingers. In particular, such information can be used to trigger the RF-Visual verification module on an AR headset.

In some embodiments, the latest received $N_v$ RFID measurements (e.g., $N_v$ can be 35) may be used at each point of time for the RF-Visual verification. This may be done because the retrieval process often includes grasping and removing items to declutter the surroundings of the target item before the user actually grasp the target item. When the latest $N_v$ satisfy the Eq. 9's criteria, the AR system may determine that the target item is in the user's hand and take some action in response (e.g., displaying a text-based notification that the target item is retrieved).

While embodiments of the present disclosure are described as using SAR and/or R-SAR to localization/validate items, other techniques may be used. For example, time of flight (ToF) between transmitted and received RF signals may be used to localize items within an environment and/or validate picked up items.

Path Optimization

Figure 5B:
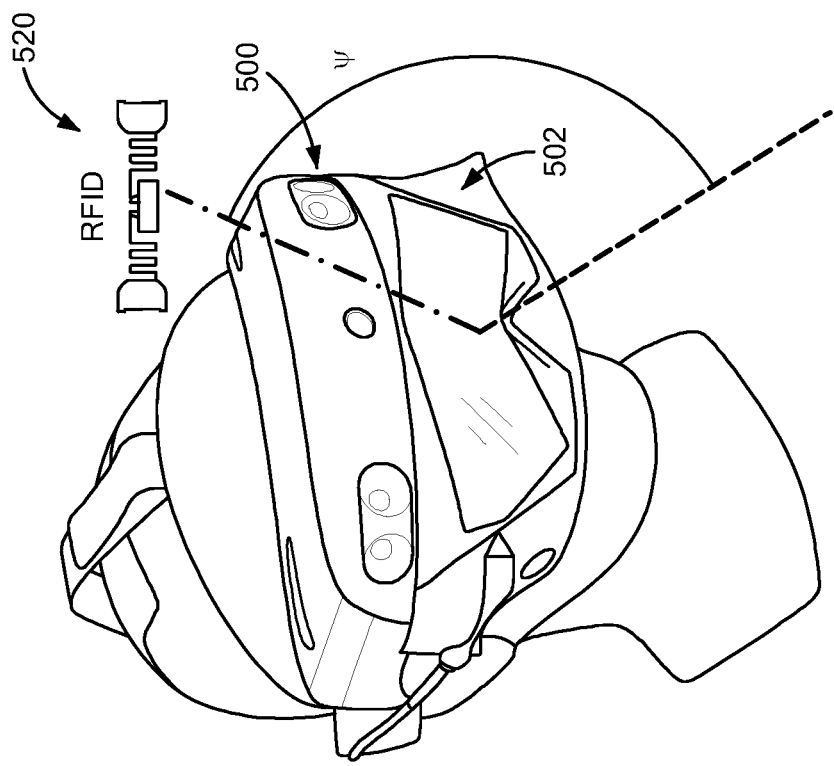
FIG. 5B is pictorial diagram of an RFID tag outside the field of view of a headset's antenna.
Figure 5A:
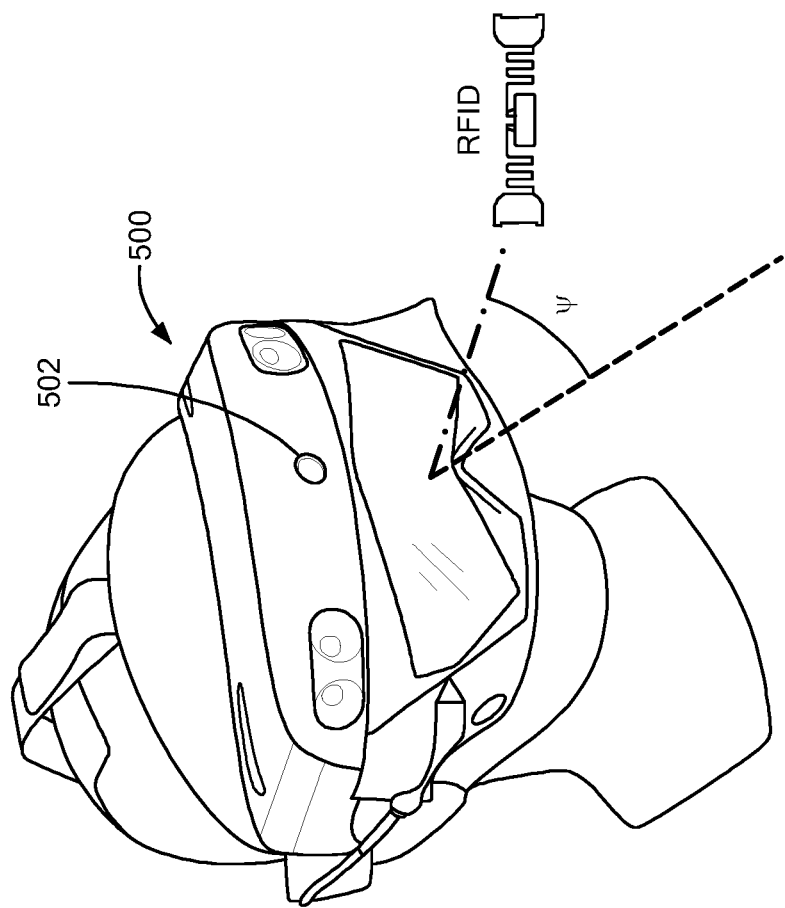
FIG. 5A is pictorial diagram of an RFID tag in front of an AR headset and within the field of view of the headset's antenna.

Turning to FIGS. 5A and 5B, embodiments of the AR system disclosed herein can seamlessly integrates RF perception and localization into the user experience. The system uses a "human-in-the-loop" design and provides a dynamic RF-based user interface to help users efficiently and accurately localize hidden RFID tags in an environment. Particularly, RF measurements from different locations are required to locate target RFID tags, and it is important to achieve proper measurement aperture for accurate and quick tag localization. However, it may be complicated for a typical AR user to optimize their path or measurement aperture without prior knowledge of a target item's location and a complete understanding of RF measurements and localization techniques. Thus, it may be desirable to integrate RF perception into a user-centered design such that technical details are abstracted away while still providing meaningful information that can be understood by a typical user.

AR systems described herein may be configured to perform path optimization, whereby the AR system predicts the quality of RFID measurements in potential trajectories, determines the optimal one, and directs the user along that path.

As a first step, the AR system can determine what would be the optimal trajectory for the user. To do this, every time the system receives a new RF measurement, it can generate a list of possible next locations for a user to walk to. It can predict the quality of an RF measurements at each candidate location, and then direct the user towards the best location with a holographic arrow. To estimate the quality of an RF measurement for target item localization, multiple factors can be analyzed: 1) Dilution of Precision (DoP), 2) Signal-to-Noise Ration SNR, and 3) distance to the estimated target location. Each factor is described in detail below.

To improve the accuracy of RFID tag localization, RF measurements should be taken over a wide aperture. This is because each RF measurement inherently suffers from some level of error. When combining multiple RF measurements, these errors can accumulate and significantly increase the localization error. This phenomenon is called DoP. When RF measurements are taken over a wider aperture, the DoP will be smaller, meaning that the effect of small errors in each RF measurement on the final localization accuracy will be less significant.

Formally, the DoP value can be calculated based on RF measurement positions as follows:

$$A = \begin{bmatrix} \frac{x_1 - x_p}{R_1} & \frac{y_1 - y_p}{R_1} & \frac{z_1 - z_p}{R_1} \\ \frac{x_2 - x_p}{R_2} & \frac{y_2 - y_p}{R_2} & \frac{z_2 - z_p}{R_2} \\ \vdots & \vdots & \vdots \\ \frac{x_n - x_p}{R_n} & \frac{y_n - y_p}{R_n} & \frac{z_n - z_p}{R_n} \end{bmatrix} \quad (10)$$

$$Q = (A^T A)^{-1}, DOP = \sqrt{tr(Q)} \quad (11)$$

where $(x_i, y_i, z_i)$ correspond to the location of the antenna at time i, $(x_p, y_p, z_p)$ is the estimated target RFID tag location calculated from the collected RF measurements, $R_i$ is the distance from $(x_i, y_i, z_i)$ to $(x_p, y_p, z_p)$, and tr(.) is the trace of matrix.

An AR system according to the present disclosure can use DoP as a metric to evaluate the potential of a measurement taken at a given position to aid in localizing the tag. First, to determine a position for consideration, the system can use information regarding the speed the user is walking at to estimate the location of the user at time t. For example, if the user is at a current location $\vec{p}_c = (x_c, y_c, z_c)$ while moving at the speed v in direction $\theta_c$, the future measurement position $\vec{p}_f$ after a period time $t_a$ can be estimated as:

$$\vec{r}(\theta_c, v, t_a) = [vt_a \cos(\theta_c), vt_a \sin(\theta_c), 0] \quad (12)$$

$$\vec{p}_f(\theta_c, v, t_a) = \vec{p}_c + \vec{r}(\theta_c, v, t_a) \quad (13)$$

At the position $\vec{p}_c$, the system can calculate how much the DoP would change if the user moves to $\vec{p}_f$. The improvement in DoP can be described by the function $C_1(\theta_c, v, t_a)$ defined as:

$$C_1(\theta_c, v, t_a) = DOP_{\{\vec{p}_1, \vec{p}_2, \ldots, \vec{p}_c, \vec{p}_f\}} - DOP_{\{\vec{p}_1, \vec{p}_2, \ldots, \vec{p}_c\}} \quad (14)$$

where $\{\vec{p}_1, \vec{p}_2, \ldots, \vec{p}_c\}$ are past measurement positions and P f is the candidate future measurement position.

Another important metric for evaluating the quality of RF measurements is SNR. Without sufficient SNR, an RF measurement may not be useful to accurately estimate the wireless channel and help determine the location of a target RFID tag. A measurements' SNR can be influenced by multiple factors, including the distance and angular separation between the antenna and the target RFID tag, the antenna's radiation pattern and gain, and environmental noise and interference. Since the environmental multipath and noise is generally hard to predict and the antenna gain does not change, embodiments of the present disclosure may estimate the quality of SNR at a candidate position by considering the angular separation between the user and the estimated location of the RFID tag. (It may be assumed that the user is looking in the direction they are walking.)

FIG. 5A shows an RF headset 500 having a conformal antenna 502 mounted on its visor. Headset 500 may be the same as or similar to the base headset 200 of FIG. 2A and/or headset 220 of FIG. 2B. As shown, if an RFID tag 504 is in front of the headset 500 and within the field of view of antenna 502, the RF measurement should have sufficiently high SNR for the purpose of determining the tag's location. However, as shown in FIG. 5B, if an RFID tag 520 is outside the field of view of antenna 502, it may not be possible to obtain RF measurements with acceptable SNRs. Embodiments of the present disclosure take this understanding into account when estimating the quality of future RF measurements.

A two-step procedure can be used to estimate the quality of SNR, according to some embodiments, First, the system can calculate angle θ between the direction normal to the headset visor and its estimate of the target RFID location as:

$$\vec{r}_h(\theta_c) = [\cos(\theta_c), \sin(\theta_c), 0] \quad (15)$$

$$\vec{r}_{tg} = \vec{p}_{tg} - \vec{p}_c \quad (16)$$

$$\psi(\theta_c) = \cos^{-1} \frac{\vec{r}_{tg} \vec{r}_h(\theta_c)}{\|\vec{r}_{tg}\| \|\vec{r}_h(\theta_c)\|} \quad (17)$$

where $\vec{r}_h$ is the heading vector of the user walking in direction $\theta_c$, and $\vec{r}_{tg}$ is the vector from the current user location to the estimated location. Based on ψ, the system can estimate the quality of SNR and scores it as follows:

$$C_2(\theta_c) = |\sin(\psi(\theta_C))|, \psi \in \left[-\frac{\pi}{2}, \frac{\pi}{2}\right] \quad (18)$$

where $C_2$ is the estimate quality of RF measurement SNR.

Another factor that impacts the efficiency of finding hidden objects is the distance the users have to walk. Thus, embodiments of the present disclosure can evaluate the quality of future RF measurement locations by also considering their distance to the target location. Specifically, the distance component of measurement quality can be formulated as:

$$C_3(\theta_c, v, t_a) = \|\vec{p}_{tg} - \vec{p}_f\| \quad (19)$$

where $\vec{p}_{tg}$ is the estimated location of the target RFID tag and $\vec{p}_f$ is the future measurement position as described in Eq. 13.

One or more of the factors mentioned above may be used by an AR system according to the present disclosure to decide on optimal candidate location to guide the user to. The system can sample $\theta_c$ from a discrete set of angles $S_\theta$, and calculate the candidate RF measurement locations using to Eq. 13. To find the optimal guided direction $\theta_c^*$, the system can minimize the following cost function:

$$\theta_c^* = \underset{\theta_c}{\mathrm{argmin}} \, C_1(\theta_c, v, t_a) + C_2(\theta_c) + C_3(\theta_c, v, t_a) \quad (20)$$

Based on the found $\theta_c^*$, the system can then guide users towards the optimal path using a holographic arrow as described below.

RF-Based Dynamic User Interface

Figure 6A:
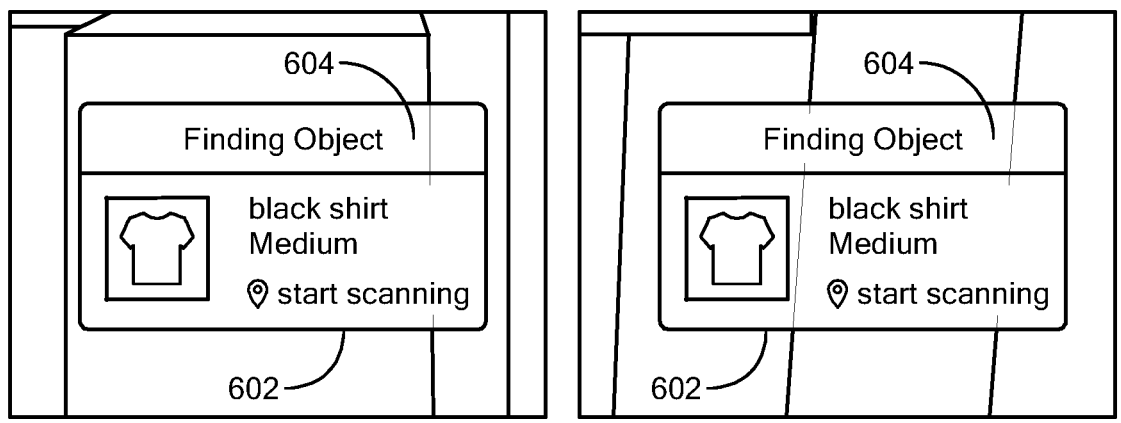
FIGS. 6A-C are pictorial diagrams showing an example of a user interface (UI) for guiding a user to an occuled item, according to some embodiments.
Figure 6B:
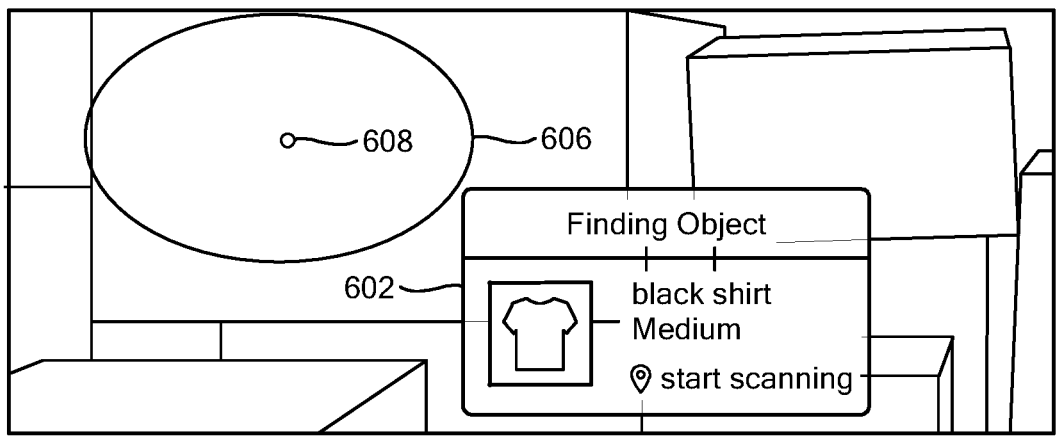
Figure 6C:
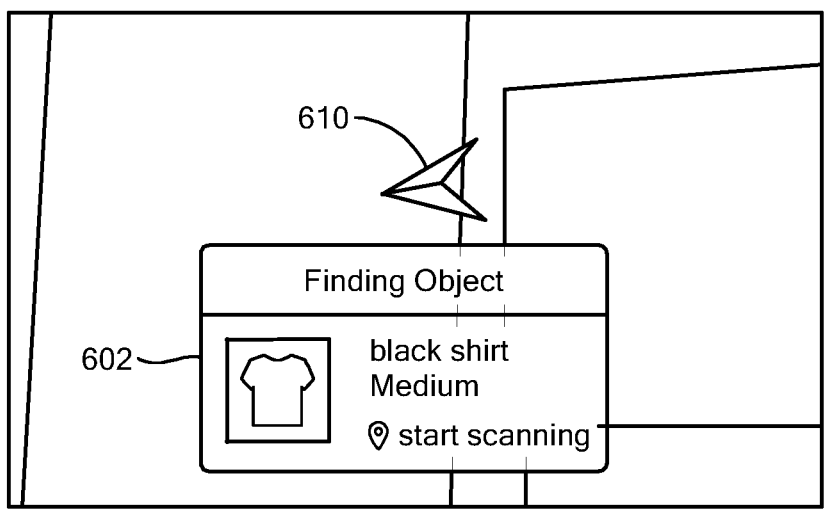

Turning to FIGS. 6A-C, the path optimization technique just described may be used to provide an interactive and dynamic user display for optimized RFID localization. Visual cues and holographic prompts may be provided that abstract away all the technical detail of RF measurements while still enabling the user to efficiently find hidden RFID tagged objects. The user may be provided with actionable prompts that reduce the overall time and distance traveled needed for RFID localization.

FIG. 6A shows an example of a visual cue can exploit SNR to create an indicator for the user, according to some embodiments. As previously mentioned, low SNR prevents proper estimation of the wireless channel. In some embodiments, an AR system can perform multiple channel estimations over 200 MHz of bandwidth and then average the result. In such embodiments, it can be assumed that a low average SNR at a position is not the result of environmental interference (which is unlikely to manifest at all frequencies), but rather the result of the user (and the visor-mounted antenna) facing a direction where the tag is not located.

In some embodiments, SNR status can be communicated through a color-coded floating widget allowing the user to rule out possible tag locations and position themselves to optimize channel measurements. If the SNR is larger than μ, the system can show the user a particular color (e.g., blue), whereas if the SNR is smaller than μ, it shows the user a different color (e.g., red for warning). In the example of FIG. 6A, a prompt 602 can have a header 604 whereby the background color of header 604 can vary (e.g., blue or red) as the visual cue. It will be appreciated that various types styling (not just color) can be applied to various types of widgets (not just prompts) to communicate SNR status.

The value of μ can be selected such that RF measurements above the threshold provide useful channel information. In one example, μ=4 dB. This simple and intuitive system enables users to quickly and easily identify areas with optimal RFID signal quality, allowing for efficient and accurate tag localization.

FIG. 6B shows how the concept of confidence in the estimated tag location can be visualized and presented to a user, according to some embodiments. Recall that SAR computes the power at each location in space based on Eq 1. To quantify the confidence of SAR in correctly determining the peak power location (corresponding to the target RFID tag), a system can select the (x, y, z) points in space where the calculated power falls within 0.75 dB of the peak power. Then, the system can extract the maximum distance along the x,y,z dimension for the selected points. When the area of these points is very large, it shows that SAR has not been able to narrow down the location of the RFID tag with reasonable confidence. Since these points tend to cluster into a 3D ellipse shape around the peak power, a holographic ellipsoid 606 can be displayed and fit to the extracted x,y,z axis 608, as shown in the example of FIG. 6B.

The ellipsoid 606 in the AR display can be modeled using the standard equations for Cartesian coordinate systems:

$$\frac{x^2}{a^2} + \frac{y^2}{b^2} + \frac{z^2}{c^2} = 1 \quad (21)$$

where a, b and c are the lengths of the semi-axis of the ellipsoid that correspond to the extracted axis dimensions.

As the confidence interval size updates with the addition of new measurements, the holograph of the ellipsoid 606 can be updated as well. In some embodiments, the RFID tag may be considered confidently localized when the axis dimensions of the ellipsoid falls below $(\tau_x, \tau_y, \tau_z)$, corresponding to a strong confidence in the predicted location. In one example, $(\tau_x, \tau_y, \tau_z)=(0.12, 0.14, 0.27)$.

FIG. 6C shows an example of a visual cue for directing users to the optimal next location (as determined using above-described techniques) for a measurement to increase the accuracy and efficiency of RFID localization, according to some embodiments. In this example, an arrow 610 may be displayed above the floating prompt 602 associated with the target item. This arrow 610 may be updated (e.g., every frame) to ensure that it is always pointing the user in the correct direction as the user moves and walks through an environment.

The pointing direction of arrow 610 may also be updated when new directions from path optimization are sent. The pointing vector of the arrow 610 may be calculated every frame as $\vec{q} = \langle x_n - x_h, y_n - y_h, z_n - z_h \rangle$ where $(x_h, y_h, z_h)$ are the coordinates just above the holographic floating canvas (base of the arrow) and $(x_n, y_n, z_n)$ is the location that the system guides the user to, which is formulated as $\vec{p}_n(\theta_c^*, v, t_a)$ and is defined in Eq. 13. To make sure that the arrow does not point in an angled upward or downward direction that would confuse users, z h can be set equal to the height of the user's head, which can be estimated by the VIO self-tracking of the AR device.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A mobile augmented reality (AR) system comprising:
   a receiver configured to receive radio frequency (RF) signals from one or more items located within an environment;
   a tracking module configured to generate tracking data responsive to a location of the system within the environment over time;
   a display device; and
   one or more processors configured to:
      determine a location of at least one of the one or more items within the environment using the received RF signals and the tracking data, the determining of the location including:
         performing reverse synthetic aperture radar (R-SAR) on the RF signals to track locations of a radio frequency identification (RFID) tag of the at least one of the one or more items as it is being picked up,
         determining an identifier of the at least one of the one or more items based at least in part on the RFID tag locations, and
         verifying the at least one of the one or more items is a correct item to be picked up based on comparing the determined item identifier to an expected item identifier; and
      generate a visual representation of the location of the at least one of the one or more items for display on the display device.

2. The mobile AR system of claim 1 wherein the display device is a visor of an AR headset and the receiver is integrated into the AR headset.

3. The mobile AR system of claim 2 wherein the tracking module is external to the AR headset.

4. The mobile AR system of claim 2 wherein the receiver comprises a conformal antenna located about the visor of the AR headset.

5. The mobile AR system of claim 1 wherein the display device is a screen of a mobile handheld device further comprising the receiver, tracking module, and one or more processors.

6. The mobile AR system of claim 1 wherein the receiver forms a part of a transceiver further configured to transmit RF signals within the environment, and wherein the received RF signals are in response to the transmitted RF signals.

7. The mobile AR system of claim 6 wherein the received RF signals are received from one or more RFID tags collocated with respective ones of the one or more items.

8. The mobile AR system of claim 6 wherein the one or more processors are configured to determine the location of the at least one of the one or more items using time of flight (ToF) between the transmitted RF signals and the received RF signals.

9. The mobile AR system of claim 1 wherein the one or more processors are configured to determine the location of the at least one of the one or more items using synthetic aperture radar (SAR) with the tracking data used to obtain SAR antenna locations.

10. The mobile AR system of claim 1 wherein the visual representation of the location of the at least one of the one or more items comprises at least one of:
   an arrow indicating the location of the at least one of the one or more items; or
   a holographic sphere or ellipse indicating the location of the at least one of the one or more items.

11. A conformal antenna for use with an augmented reality (AR) headset, the conformal antenna comprising:
   one or more conductive surfaces configured to conform about a front surface of the AR headset and to receive radio frequency (RF) signals from one or more items located within an environment,
   wherein the AR headset is configured to:
      perform reverse synthetic aperture radar (R-SAR) on the RF signals to track locations of a radio frequency identification (RFID) tag of an item being picked up from the one or more items located within an environment;
      determine an identifier of the item being picked up based at least in part on the RFID tag locations; and
      verify the item being picked up is a correct item to be picked up based on comparing the determined item identifier to an expected item identifier.

12. The conformal antenna of claim 11 wherein the one or more conductive surfaces are configured transmit RF signals within the environment, and wherein the received RF signals are in response to the transmitted RF signals.

13. The conformal antenna of claim 12 wherein the received RF signals corresponds to reflections of the transmitted RF signals off the one or more items.

14. The conformal antenna of claim 11 wherein the AR headset includes one or more sensors positioned about the front surface, wherein the one or more conductive surfaces are configured to conform about the front surface without substantially masking the one or more sensors.

15. The conformal antenna of claim 11 wherein the one or more conductive surfaces comprises one or more tapers and one or more slots.

16. The conformal antenna of claim 11 wherein the received RF signals comprise at least one of:
   ultra-high frequency (UHF) signals;
   WiFi signals;
   millimeter wave signals; or
   terahertz (THz) signals.

17. A method for verifying an item being picked up, the method comprising:
   receiving radio frequency (RF) signals from a plurality of items within an environment;
   receiving tracking data responsive to a location of an item being picked up over time;
   performing reverse synthetic aperture radar (R-SAR) on the RF signals to track locations of a radio frequency identification (RFID) tag of the item being picked up;
   determining an identifier of the item being picked up using the received RF signals and the tracking data and by comparing the tracking data to the RFID tag locations; and
   verifying the item is a correct item to be picked up based on comparing the determined item identifier to an expected item identifier.

18. The method of claim 17 further comprising generating user feedback in response to the verifying of the item.

19. The method of claim 17 wherein the item is being picked up by one of:
   a human hand;
   a robot gripper; or
   a grabber tool.

* * * * *